United States Patent
Fujii

(10) Patent No.: US 10,232,768 B2
(45) Date of Patent: Mar. 19, 2019

(54) LANE CHANGE ASSIST DEVICE FOR A VEHICLE

(71) Applicant: TOYOTA JIDOSHA KABUSHIKI KAISHA, Toyota-shi, Aichi-ken (JP)

(72) Inventor: Shota Fujii, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/840,448

(22) Filed: Dec. 13, 2017

(65) Prior Publication Data

US 2018/0178715 A1 Jun. 28, 2018

(30) Foreign Application Priority Data

Dec. 26, 2016 (JP) ................................ 2016-251659

(51) Int. Cl.
- *B60Q 1/40* (2006.01)
- *B60W 30/18* (2012.01)
- *B60Q 1/34* (2006.01)

(52) U.S. Cl.
CPC ............. *B60Q 1/40* (2013.01); *B60Q 1/346* (2013.01); *B60W 30/18163* (2013.01); *B60W 2750/30* (2013.01)

(58) Field of Classification Search
CPC ........... B60Q 1/34; B60Q 1/38; B60Q 1/2665
USPC .... 340/435, 475, 425, 546, 476; 701/36, 96, 701/301
See application file for complete search history.

(56) References Cited

U.S. PATENT DOCUMENTS

| | | | |
|---|---|---|---|
| 2005/0155808 A1* | 7/2005 | Braeuchle | B62D 15/0255 180/402 |
| 2005/0162266 A1* | 7/2005 | Mills | B60Q 1/40 340/476 |
| 2005/0270145 A1 | 12/2005 | Kataoka et al. | |
| 2006/0009910 A1* | 1/2006 | Ewerhart | B60W 30/143 701/301 |
| 2006/0025918 A1 | 2/2006 | Saeki | |

FOREIGN PATENT DOCUMENTS

| | | |
|---|---|---|
| JP | 2014-148293 A | 8/2004 |
| JP | 2005-138647 A | 6/2005 |
| JP | 2006-315491 A | 11/2006 |
| JP | 2008-195402 A | 8/2008 |
| JP | 4172434 A | 10/2008 |
| JP | 2009-190464 A | 8/2009 |
| JP | 4349210 A | 10/2009 |

(Continued)

*Primary Examiner* — Joseph H Feild
*Assistant Examiner* — Sharmin Akhter
(74) *Attorney, Agent, or Firm* — Sughrue Mion, PLLC

(57) ABSTRACT

When a start acceptance condition for lane change assist control (LCA) is established (S12: Yes), a driving support ECU starts transmission of a turn signal flashing command to a meter ECU (S13). In this manner, flashing of a turn signal can continue even when a driver separates his or her hand from a turn signal lever. When a turn signal turning-off condition is established under a situation in which the LCA is executed (S15: Yes), the driving support ECU stops the turn signal flashing command that has been transmitted so far (S16). With this, the flashing of the turn signal can be ended even when the driver does not perform a returning operation on the turn signal lever.

8 Claims, 10 Drawing Sheets

(56) References Cited

FOREIGN PATENT DOCUMENTS

| | | | |
|---|---|---|---|
| JP | 2009-274594 | A | 11/2009 |
| JP | 2010-006279 | A | 1/2010 |
| JP | 4929777 | B2 | 5/2012 |

\* cited by examiner

LANE CHANGE ASSIST DEVICE FOR A VEHICLE

BACKGROUND OF THE INVENTION

1. Field of the Invention

The present invention relates to a lane change assist device configured to execute lane change assist control, which is control of assisting a steering operation for changing lanes.

2. Description of the Related Art

Hitherto, as proposed in Japanese Patent Application Laid-open No. 2009-274594, there has been known a lane change assist device configured to execute lane change assist control, which is control of assisting a steering operation (steering wheel operation) for changing lanes. The lane change assist device uses, for example, an electric power steering system to provide/generate a steering torque to a steering mechanism, to thereby change the lanes in which an own vehicle travels without the driver's steering operation.

The lane change assist device proposed in Japanese Patent Application Laid-open No. 2009-274594, detects an operation performed by the driver on a turn signal lever, and starts the lane change assist control in response to the operation performed on the turn signal lever.

During the lane change assist control, it is required to continue to intermittently flash a turn signal (turn signal lamp). However, when the turn signal lever is configured to return to a neutral position (turning-off position) after the operation to request the lane change assist is released, the driver is required to continuously operate (continuously press) the turn signal lever, and thus operability is not good.

SUMMARY OF THE INVENTION

The present invention has been made in order to solve the above-mentioned problem, and has an object to provide a lane change assist device having good operability.

In order to achieve the above-mentioned object, according to one embodiment of the present invention, there is provided a lane change assist device for a vehicle, including:

lane change assist request detection means (10, 40) for detecting a lane change assist request from a driver in response to a lane change assist request operation set in advance, the lane change assist request operation being an operation performed on a turn signal lever (41) to flash a turn signal (32), and being performed in order to request lane change assist;

the turn signal lever being configured to return to a neutral position (PN) when an operation force of the lane change assist request operation is released, lane change assist control means (10, 20) for, when the lane change assist request is detected (S11: Yes) and a lane change assist start acceptance condition set in advance is established (S12: Yes), accepting the lane change assist request and starting lane change assist control to change lanes in which an own vehicle travels;

turn signal drive means (30) for intermittently flashing the turn signal;

turning-off condition determination means (S15) for determining, while the lane change assist control means is executing the lane change assist control, whether or not a turn signal turning-off condition set in advance is established; and turn signal control means (S13-S16) for controlling the turn signal drive means so that the turn signal continues to be intermittently flashed from the acceptance of the lane change assist request to the establishment of the turn signal turning-off condition.

According to the lane change assist device for a vehicle of the one embodiment of the present invention, the lane change assist request detection means detects the lane change assist request from the driver in response to the lane change assist request operation set in advance, which is an operation performed on the turn signal lever to intermittently flash the turn signal (also referred to as "turn lamp" or "turn signal lamp") and is performed in order to request lane change assist.

For example, according to one or more embodiments, the lane change assist request detection means is preferably configured to detect the lane change assist request when the lane change assist request operation continues for an assist request confirmation time period set in advance or more (S11). In this case, the driver's intention to obtain the lane change assist can be properly detected.

When the lane change assist request is detected and the lane change assist start acceptance condition set in advance is established, the lane change assist control means accepts the lane change assist request to start the lane change assist control that is control of changing lanes in which the own vehicle travels. The lane change assist start acceptance condition is a condition in which it is determined that the own vehicle can safely change the lanes. Further, when the lane change assist control means executes the lane change assist control, for example, the lane change assist control means provides/generates a steering torque to a steering mechanism to steer a steering wheel, to thereby control a travel direction of the own vehicle.

The turn signal drive means intermittently flashes the turn signal when the lane change assist request operation is performed. The turn signal lever is configured to return to the neutral position, that is, a turning-off position when the operation force of the lane change assist request operation is released. While the lane change assist control is executed, the intermittently-flashing of the turn signal is required to be continued. In this case, the intermittently-flashing of the turn signal can continue when the driver continues the lane change assist request operation on the turn signal lever, but the operability is bad in that case.

In view of this, the lane change assist device for a vehicle according to the one embodiment of the present invention includes the turning-off condition determination means and the turn signal control means. The turning-off condition determination means determines, while the lane change assist control means is executing the lane change assist control, whether or not the turn signal turning-off condition set in advance is established. The turn signal control means controls the actuation of the turn signal drive means so that the intermittently-flashing of the turn signal continues from the acceptance of the lane change assist request to the establishment of the turn signal turning-off condition. That is, the turn signal control means controls the turn signal drive means so that the intermittently-flashing of the turn signal continues even when the operation force of the lane change assist request operation is released while the lane change assist control means is executing the lane change assist control.

In this manner, when the lane change assist control is started, the driver can continuously flash intermittently the turn signal even when the driver releases the operation force to the turn signal lever. As a result, according to the one embodiment of the present invention, good operability can be obtained.

A feature of one embodiment of the present invention resides in that the turn signal turning-off condition is set to be established before the lane change assist control is completed (S15-S17).

When the turn signal continues to be intermittently flashed until the lane change assist control is completed, the driver of the own vehicle and drivers of other vehicles may misunderstand that the own vehicle is further changing lanes to another adjacent lane. In view of this, according to the one embodiment of the present invention, the turn signal turning-off condition is set to be established before the lane change assist control is completed. Therefore, the driver of the own vehicle and the drivers of other vehicles can appropriately recognize the completion of the lane change in advance, and the driver of the own vehicle and the drivers of other vehicles are prevented from misunderstanding that the lane change continues.

A feature of one embodiment of the present invention resides in that the turn signal turning-off condition is set to be established after a specific point (P) of the own vehicle crosses a boundary line between an original lane before changing lanes and a target lane being a destination of changing lanes, and before the lane change assist control is completed.

According to the one embodiment of the present invention, the intermittently-flashing of the turn signal can appropriately continue. The specific point of the own vehicle represents a specific position of the own vehicle set in advance, for example, a position of the center of gravity of the own vehicle.

A feature of one embodiment of the present invention resides in that the turning-off condition determination means is configured to: acquire a remaining distance (Dyr) in a lane width direction from a current position of the own vehicle to a final target position (CL') that is a position of the own vehicle when the lane change assist control is completed; and determine that the turn signal turning-off condition is established when the remaining distance is equal to or smaller than a turning-off allowance distance (Doff) that is larger than zero.

According to the one embodiment of the present invention, the turning-off condition determination means acquires the remaining distance in the lane width direction from the current position of the own vehicle to the final target position that is the position of the own vehicle when the lane change assist control is completed. Then, the turning-off condition determination means determines that the turn signal turning-off condition is established when the remaining distance is equal to or smaller than the turning-off allowance distance that is larger than zero. For example, the turning-off condition determination means compares the remaining distance with the turning-off allowance distance. When the turning-off condition determination means detects/determines that the remaining distance is equal to or smaller than the turning-off allowance distance, the turning-off condition determination means determines that the turn signal turning-off condition is established. Therefore, the timing to end the intermittently-flashing of the turn signal can be set more appropriately.

A feature of one embodiment of the present invention resides in the lane change assist device for a vehicle, further including turn signal turning-off condition variable means (S51-S55) for changing the turn signal turning-off condition so that a timing of establishing the turn signal turning-off condition (a timing at which the turn signal turning-off condition is established) becomes earlier when a movement speed of the own vehicle in a lane width direction during the lane change assist control is lower as compared to when the movement speed is high.

When the flashing of the turn signal continues until the lane change assist control is completed, the driver of the own vehicle and the drivers of other vehicles may misunderstand that the own vehicle is further changing lanes to another adjacent lane. In particular, when the own vehicle moves in the lane width direction at low speed due to the lane change assist control, the own vehicle travels in the target lane for a long time period under a state in which the turn signal is intermittently flashing. In this case, the drivers may misunderstand the situation as described above.

In view of this, according to the one embodiment of the present invention, the turn signal turning-off condition variable means changes the turn signal turning-off condition so that the timing of establishing the turn signal turning-off condition becomes earlier when the movement speed of the own vehicle in the lane width direction during the lane change assist control is lower as compared to when the movement speed is high. In this manner, the timing to end the flashing of the turn signal can be further appropriately set, and the drivers are prevented from misunderstanding the situation as described above.

A feature of one embodiment of the present invention resides in that the turn signal turning-off condition variable means (S51-S55) is configured to change the turn signal turning-off condition so that a distance (Dyr) in the lane width direction from a position of the own vehicle when the turn signal turning-off condition is established to a final target position (CL') that is the position of the own vehicle when the lane change assist control is completed becomes longer when the movement speed of the own vehicle in the lane width direction during the lane change assist control is lower as compared to when the movement speed is high.

According to the one embodiment of the present invention, the turn signal turning-off condition is changed so that the distance in the lane width direction from the position of the own vehicle when the turn signal turning-off condition is established to the final target position that is the position of the own vehicle when the lane change assist control is completed becomes longer when the movement speed of the own vehicle in the lane width direction during the lane change assist control is lower. In this manner, the timing to end the intermittently-flashing of the turn signal can be appropriately changed in accordance with the movement speed of the own vehicle in the lane width direction.

A feature of one embodiment of the present invention resides in that the turning-off condition determination means is configured to:

acquire the remaining distance (Dyr) in the lane width direction from a current position of the own vehicle to the final target position; and determine that the turn signal turning-off condition is established (S15: Yes) when the remaining distance is equal to or smaller than a turning-off allowance distance (Doff) that is larger than zero, and the turn signal turning-off condition variable means is configured to set the turning-off allowance distance to be longer when the movement speed of the own vehicle in the lane width direction during the lane change assist control is lower as compared to when the movement speed is high.

According to the one embodiment of the present invention, the turning-off allowance distance is set to be longer when the movement speed of the own vehicle in the lane width direction during the lane change assist control is lower. Therefore, by changing the turning-off allowance distance, the timing to end the intermittently-flashing of the turn signal can be appropriately changed.

In the above description, in order to facilitate understanding of the invention, reference symbols used in embodiments of the present invention are enclosed in parentheses and are assigned to each of the constituent features of the invention corresponding to the embodiments. However, each of the constituent features of the invention is not limited to the embodiments defined by the reference symbols.

DESCRIPTION OF THE EMBODIMENTS

Referring to the accompanying drawings, a lane change assist device for a vehicle according to an embodiment of the present invention is described below.

Figure 1:
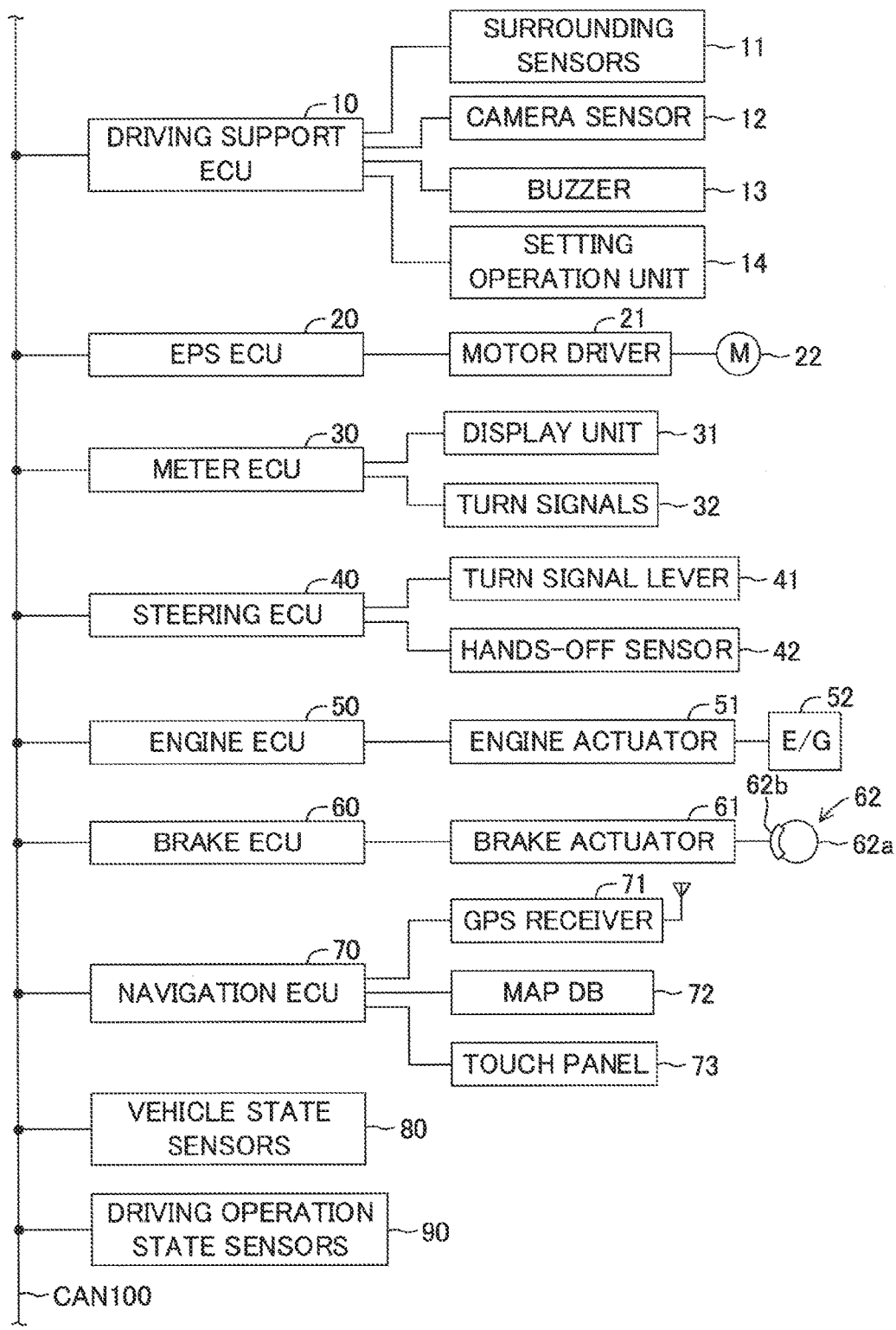
FIG. 1 is a schematic configuration diagram for illustrating a lane change assist device for a vehicle according to an embodiment of the present invention.

The lane change assist device according to the embodiment of the present invention is applied to a vehicle (hereinafter also referred to as an "own vehicle" in order to distinguish from other vehicles), and as illustrated in FIG. 1, includes a driving support ECU 10, an electric power steering ECU 20, a meter ECU 30, a steering ECU 40, an engine ECU 50, a brake ECU 60, and a navigation ECU 70.

Those ECUs are electric control units each including a microcomputer as a main part, and are connected to one another so as to be able to mutually transmit and receive information via a controller area network (CAN) 100. The microcomputer herein includes a CPU, a ROM, a RAM, a nonvolatile memory, an interface I/F, and the like. The CPU executes instructions (programs and routines) stored in the ROM to realize various functions. Some or all of those ECUs may be integrated into one ECU.

Further, a plurality of types of vehicle state sensors 80 configured to detect a vehicle state and a plurality of types of driving operation state sensors 90 configured to detect a driving operation state are connected to the CAN 100. Examples of the vehicle state sensors 80 include a vehicle speed sensor configured to detect a travel speed of the vehicle, a front-rear G sensor configured to detect an acceleration in a front-rear direction of the vehicle, a lateral G sensor configured to detect an acceleration in a lateral direction of the vehicle, and a yaw rate sensor configured to detect a yaw rate of the vehicle.

Examples of the driving operation state sensors 90 include an accelerator operation amount sensor configured to detect an operation amount of an accelerator pedal, a brake operation amount sensor configured to detect an operation amount of a brake pedal, a brake switch configured to detect presence or absence of the operation on the brake pedal, a steering angle sensor configured to detect a steering angle, a steering torque sensor configured to detect a steering torque, and a shift position sensor configured to detect a shift position of a transmission.

Information (hereinafter referred to as "sensor information") detected by the vehicle state sensors 80 and the driving operation state sensors 90 is transmitted to the CAN 100. In each ECU, the sensor information transmitted to the CAN 100 can be used as appropriate. The sensor information is information of a sensor connected to a specific ECU, and may be transmitted from the specific ECU to the CAN 100. For example, the accelerator operation amount sensor may be connected to the engine ECU 50. In this case, the sensor information representing the accelerator operation amount is transmitted from the engine ECU 50 to the CAN 100. For example, the steering angle sensor may be connected to the steering ECU 40. In this case, the sensor information representing the steering angle is transmitted from the steering ECU 40 to the CAN 100. The same applies to the other sensors. Further, there may be employed a configuration in which, without interpolation of the CAN 100, the sensor information is transmitted and received through direct communication between specific ECUs.

Figure 2:
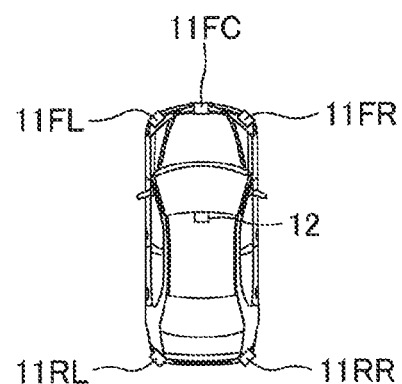
FIG. 2 is a plan view for illustrating disposing positions of surrounding sensors and a camera sensor.

The driving support ECU 10 is a control device serving as a central device for performing driving support for a driver, and executes lane change assist control, lane trace assist control, and adaptive cruise control. As illustrated in FIG. 2, a front-center surrounding sensor 11FC, a front-right surrounding sensor 11FR, a front-left surrounding sensor 11FL, a rear-right surrounding sensor 11RR, and a rear-left surrounding sensor 11RL are connected to the driving support ECU 10. The surrounding sensors 11FC, 11FR, 11FL, 11RR, and 11RL are radar sensors, and basically have the same configuration as each other except that the sensors have different detection regions. In the following, the surrounding sensors 11FC, 11FR, 11FL, 11RR, and 11RL are referred to as "surrounding sensors 11" when the sensors are not required to be individually distinguished from one another.

Each of the surrounding sensors 11 includes a radar transceiver and a signal processor (not shown). The radar transceiver radiates a radio wave in a millimeter waveband (hereinafter referred to as "millimeter wave"), and receives a millimeter wave (that is, reflected wave) reflected by a three-dimensional object (e.g., other vehicles, pedestrian, bicycle, and building) present within a radiation range. The signal processor acquires, every time a predetermined time period elapses, information (hereinafter referred to as "surrounding information") representing, for example, a distance between the own vehicle and the three-dimensional object, a relative speed between the own vehicle and the three-dimensional object, and a relative position (direction) of the three-dimensional object with respect to the own vehicle based on, for example, a phase difference between the transmitted millimeter wave and the received reflected wave, an attenuation level of the reflected wave, and a time period required from transmission of the millimeter wave to reception of the reflected wave. Then, the signal processor transmits the surrounding information to the driving support ECU 10. The surrounding information can be used to detect a front-rear direction component and a lateral direction component in the distance between the own vehicle and the three-dimensional object and a front-rear direction component and a lateral direction component in the relative speed between the own vehicle and the three-dimensional object.

As illustrated in FIG. 2, the front-center surrounding sensor 11FC is disposed at a front-center portion of a vehicle body, and detects a three-dimensional object present in a front region of the own vehicle. The front-right surrounding sensor 11FR is disposed at a front-right corner portion of the vehicle body, and mainly detects a three-dimensional object present in a front-right region of the own vehicle. The front-left surrounding sensor 11FL is disposed at a front-left corner portion of the vehicle body, and mainly detects a three-dimensional object present in a front-left region of the own vehicle. The rear-right surrounding sensor 11RR is disposed at a rear-right corner portion of the vehicle body, and mainly detects a three-dimensional object present in a rear-right region of the own vehicle. The rear-left surrounding sensor 11RL is disposed at a rear-left corner portion of the vehicle body, and mainly detects a three-dimensional object present in a rear-left region of the own vehicle. In the following, the three-dimensional object detected by the surrounding sensor 11 is sometimes referred to as an "object".

In this embodiment, the surrounding sensors 11 are radar sensors, but other sensors such as clearance sonars can be employed instead.

Further, a camera sensor 12 is connected to the driving support ECU 10. The camera sensor 12 includes a camera unit and a lane recognition unit configured to analyze image data obtained based on an image taken by the camera unit to recognize a white line(s) of a road. The camera sensor 12 (camera unit) photographs a landscape in front (ahead) of the own vehicle. The camera sensor 12 (lane recognition unit) supplies information relating to the recognized white line(s) to the driving support ECU 10.

Figure 3:
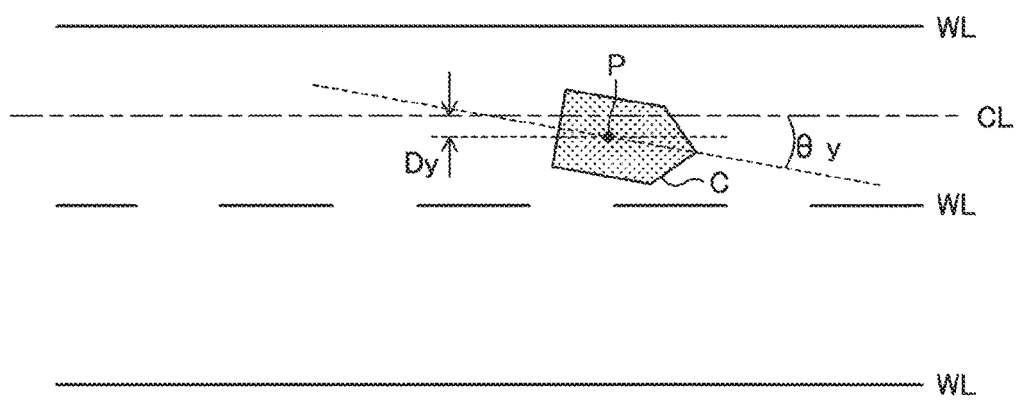
FIG. 3 is a diagram for illustrating lane-related vehicle information.

As illustrated in FIG. 3, the driving support ECU 10 sets/determines a lane center line CL corresponding to a center position in a width direction of right and left white lines WL in a lane in which the own vehicle is traveling based on the information supplied from the camera sensor 12. The lane center line CL is used as a target travel line in the lane trace assist control to be described later. Further, the driving support ECU 10 calculates a curvature Cu of a curve of the lane center line CL.

Further, the driving support ECU 10 calculates the position and the direction of the own vehicle in the lane sectioned by the right and left white lines WL. For example, as illustrated in FIG. 3, the driving support ECU 10 calculates a distance Dy in a road width direction between a reference point P (e.g., position of center of gravity) of an own vehicle C and the lane center line CL, that is, the distance Dy by which the own vehicle C is shifted (deviates) from the lane center line CL in the road width direction. This distance Dy is referred to as a "lateral difference Dy". Further, the driving support ECU 10 calculates an angle formed between the direction of the lane center line CL and the direction in which the own vehicle C faces, that is, an angle θy by which the direction in which the own vehicle C faces is shifted (deviates) in a horizontal plane from the direction of the lane center line CL. This angle θy is referred to as a "yaw angle θy". In the following, information (Cu, Dy, and θy) representing the curvature Cu, the lateral difference Dy, and the yaw angle θy is referred to as "lane-related vehicle information".

Further, the camera sensor 12 also supplies, to the driving support ECU 10, information relating to the white line(s), for example, the type of the detected white line (solid line or broken line), a distance (lane width) between the right and left adjacent white lines, and the shape of the white line, on not only the lane of the own vehicle but also on adjacent lanes. When the white line is a solid line, the vehicle is inhibited from crossing the white line to change lanes. Otherwise, e.g., when the white line is a broken line (white line intermittently formed at certain intervals), the vehicle is allowed to cross the white line to change lanes. The lane-related vehicle information (Cu, Dy, and θy) and the information relating to the white line(s) are collectively referred to as "lane information".

In this embodiment, the driving support ECU 10 calculates the lane-related vehicle information (Cu, Dy, and θy). Alternatively, the camera sensor 12 may be configured to calculate the lane-related vehicle information (Cu, Dy, and θy) to supply the calculation result to the driving support ECU 10.

Further, the camera sensor 12 can also detect a three-dimensional object present in front (ahead) of the own vehicle based on the image data. Therefore, not only the lane information but also front surrounding information may be acquired through calculation. In this case, for example, there may be provided a synthesis processor (not shown) configured to synthesize the surrounding information acquired by the front-center surrounding sensor 11FC, the front-right surrounding sensor 11FR, and the front-left surrounding sensor 11FL and the surrounding information acquired by the camera sensor 12 to generate front surrounding information having a high detection accuracy. The surrounding information generated by the synthesis processor may be supplied to the driving support ECU 10 as the front surrounding information on the own vehicle.

A buzzer 13 is connected to the driving support ECU 10. The buzzer 13 receives a buzzer sounding signal as input from the driving support ECU 10 and produces a sound. The driving support ECU 10 sounds the buzzer 13 when, for example, the driving support ECU 10 notifies the driver of a driving support situation, or when the driving support ECU 10 alerts the driver.

In this embodiment, the buzzer 13 is connected to the driving support ECU 10, but the buzzer 13 may be connected to other ECUs, for example, a notification ECU (not shown) dedicated for notification, and the buzzer 13 may be sounded by the notification ECU. In this case, the driving support ECU 10 transmits a buzzer sounding command to the notification ECU.

Further, instead of or in addition to the buzzer 13, a vibrator for transmitting vibration for notification to the driver may be provided. For example, the vibrator is provided to a steering wheel to vibrate the steering wheel, to thereby alert the driver.

The driving support ECU 10 executes the lane change assist control, the lane trace assist control, and the adaptive cruise control based on the surrounding information supplied from the surrounding sensors 11, the lane information obtained based on the white line recognition by the camera sensor 12, the vehicle state detected by the vehicle state sensors 80, the driving operation state detected by the driving operation state sensors 90, and the like.

A setting operation unit 14 to be operated by the driver is connected to the driving support ECU 10. The setting operation unit 14 is an operation unit for performing setting or the like regarding whether or not to execute each of the lane change assist control, the lane trace assist control, and the adaptive cruise control. The driving support ECU 10 receives a setting signal as input from the setting operation unit 14 to determine whether or not to execute each control. In this case, when the execution of the adaptive cruise control is not selected, the lane change assist control and the lane trace assist control are also automatically set to be unexecuted. Further, when the execution of the lane trace assist control is not selected, the lane change assist control is also automatically set to be unexecuted.

Further, the setting operation unit 14 has a function of inputting parameters or the like representing the preference of the driver when the above-mentioned control is executed.

The electric power steering ECU 20 is a control device for an electric power steering device. In the following, the electric power steering ECU 20 is referred to as an "EPS ECU 20". The EPS ECU 20 is connected to a motor driver 21. The motor driver 21 is connected to a steering motor 22. The steering motor 22 is integrated/incorporated into a "steering mechanism including the steering wheel, a steering shaft coupled to the steering wheel, a steering gear mechanism, and the like" (not shown) of the vehicle. The EPS ECU 20 detects the steering torque that is input by the driver to the steering wheel (not shown) with a steering torque sensor mounted in the steering shaft, and controls energization to the motor driver 21 based on the steering torque to drive the steering motor 22. The assist motor is driven as described above so that the steering torque is applied to the steering mechanism, and thus the steering operation of the driver is assisted.

Further, when the EPS ECU 20 receives a steering command from the driving support ECU 10 via the CAN 100, the EPS ECU 20 drives the steering motor 22 at a control amount expressed by the steering command to generate a steering torque. This steering torque represents a torque to be applied to the steering mechanism in response to the steering command from the driving support ECU 10, which does not require the driver's steering operation (steering wheel operation) unlike a steering assist torque to be applied for alleviating the driver's steering operation described above.

The meter ECU 30 is connected to a display unit 31 and right and left turn signals 32 (meaning turn signal lamps and sometimes also referred to as "turn lamps"). The display unit 31 is, for example, a multi-information display mounted in front of a driver's seat, and displays various types of information in addition to values measured by meters, for example, a vehicle speed. For example, when the meter ECU 30 receives a display command in accordance with the driving support state from the driving support ECU 10, the meter ECU 30 displays a screen instructed in the display command on the display unit 31. As the display unit 31, instead of or in addition to the multi-information display, a head-up display (not shown) can also be employed. When the head-up display is employed, it is preferred to provide a dedicated ECU for controlling the display on the head-up display.

Further, the meter ECU 30 includes a turn signal drive circuit (not shown). When the meter ECU 30 receives a turn signal flashing command via the CAN 100, the meter ECU 30 intermittently flashes the turn signal 32 arranged in a right or left direction instructed by the turn signal flashing command. Further, while the meter ECU 30 intermittently flashes the turn signal 32, the meter ECU 30 transmits, to the CAN 100, turn signal flashing information representing that the turn signal 32 is in an intermittently flashing state. Therefore, other ECUs can recognize the intermittently flashing state of the turn signal 32.

The steering ECU 40 is connected to a turn signal lever 41 and a hands-off sensor 42. The turn signal lever 41 is an operation unit for working (intermittently flashing) the turn signal 32, and is mounted in a steering column. The turn signal lever 41 is mounted to be swingable at a two-stage operation stroke about a support shaft in each of a clockwise operation direction and a counterclockwise operation direction.

Figure 4:
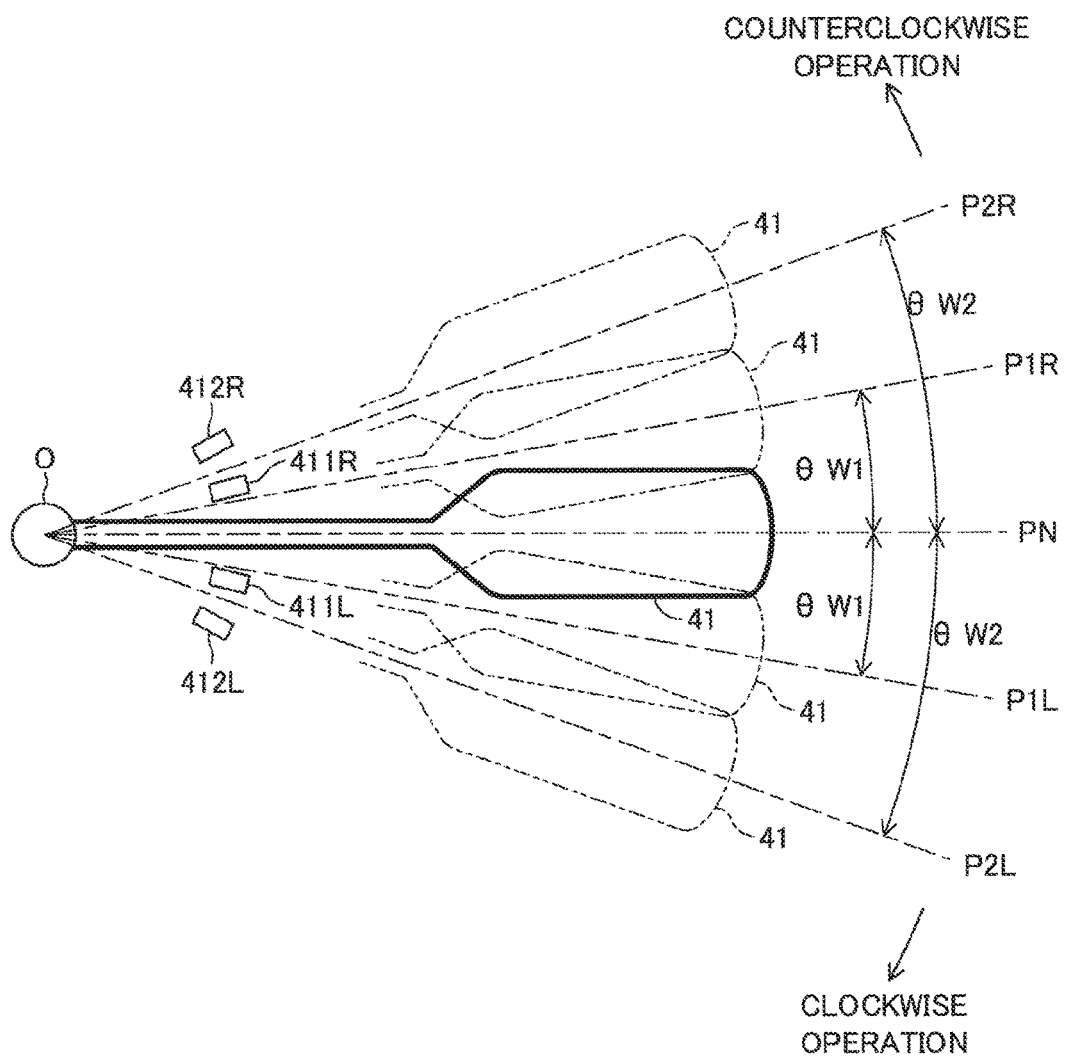
FIG. 4 is a diagram for illustrating actuation of a turn signal lever.

As illustrated in FIG. 4, the turn signal lever 41 is configured to be able to be operated selectively between a first operation position P1L (P1R), which is a position at which the turn signal lever 41 is rotated by a first stroke from a neutral position PN (rotated by a first angle θW1 about a support shaft O), and a second operation position P2L (P2R), which is a position at which the turn signal lever 41 is rotated by a second stroke larger than the first stroke and which is deeper than the first operation position P1L (P1R) from the neutral position PN (rotated by a second angle θW2 (>θW1) about the support shaft O), in each of the clockwise operation direction and the counterclockwise operation direction. The neutral position PN is a position obtained under a state in which the turn signal lever 41 is not operated, that is, a position at which the turn signal 32 is turned off.

When the driver tilts the turn signal lever 41 to the first operation position P1L (P1R), the turn signal lever 41 provides a click feeling to the driver. When the operation force to the turn signal lever 41 is released from this state, the turn signal lever 41 is mechanically returned to the neutral position PN by a returning mechanism (not shown), for example, a spring. Further, when the driver tilts the turn signal lever 41 to the second operation position P2L (P2R), the turn signal lever 41 is held at the second operation position P2L (P2R) by a mechanical lock mechanism (not shown) even when the operation force is released.

The turn signal lever 41 includes a first switch 411L (411R) that is turned on only when the turn signal lever 41 is tilted to the first operation position P1L (P1R), and a second switch 412L (412R) that is turned on only when the turn signal lever 41 is tilted to the second operation position P2L (P2R).

The first switch 411L (411R) transmits an ON signal to the steering ECU 40 while the turn signal lever 41 is located at the first operation position P1L (P1R), and the second switch 412L (412R) transmits an ON signal to the steering ECU 40 while the turn signal lever 41 is located at the second operation position P2L (P2R). The operation positions and the switches with reference symbols in parenthesis in the description above represent the operation positions and the switches relating to the counterclockwise operation direction.

Under a state in which the turn signal lever 41 is held at the second operation position P2L (P2R), when the steering wheel is reversely rotated to be returned to the neutral position, or when the driver operates the turn signal lever 41 to return the turn signal lever 41 in the neutral position direction, the locking by the lock mechanism is released, and the turn signal lever 41 is returned to the neutral position PN. That is, when the turn signal lever 41 is operated to the second operation position P2L (P2R), the turn signal lever 41 acts in the same manner as a turn signal flashing device which has been hitherto carried out generally. In the following, the operation of tilting the turn signal lever 41 to the first operation position P1L (P1R) is referred to as a "shallow pressing operation", and the operation of tilting the turn signal lever 41 to the second operation position P2L (P2R) is referred to as a "deep pressing operation".

Such a turn signal lever configured to switch a switch signal at a two-stage operation stroke is known in, for example, Japanese Patent Application Laid-open No. 2005-138647. This known configuration can be employed also in this embodiment.

The steering ECU 40 transmits, to the driving support ECU 10, a monitoring signal representing presence/absence of the shallow pressing operation on the turn signal lever 41, that is, an on/off state of the first switch 411L (411R), and a monitoring signal representing presence/absence of the deep pressing operation on the turn signal lever 41, that is, an on/off state of the second switch 412L (412R). In the following, the monitoring signal representing the on/off state of the first switch 411L (411R) is referred to as a "shallow pressing operation monitoring signal", and the monitoring signal representing the on/off state of the second switch 412L (412R) is referred to as a "deep pressing operation monitoring signal". Each of the shallow pressing operation monitoring signal and the deep pressing operation monitoring signal includes a signal for identifying the operation direction (right/left direction) of the turn signal lever 41.

Further, the steering ECU 40 intermittently flashes the turn signal 32 arranged on a side corresponding to the direction in which the turn signal lever 41 is operated while the first switch 411L (411R) is turned on. The steering ECU 40 transmits, to the meter ECU 30, a turn signal flashing command for designating the operation direction (right/left direction) of the turn signal lever 41 so that the turn signal 32 is to be intermittently flashed while the first switch 411L (411R) is turned on. While the meter ECU 30 receives the turn signal flashing command, the meter ECU 30 intermittently flashes the turn signal 32 arranged on the side corresponding to the designated direction. Therefore, the driver can perform the shallow pressing operation on the turn signal lever 41 to intermittently flash the turn signal 32.

When a period in which the first switch 411L (411R) is turned on is shorter than a minimum flashing time period set in advance (that is, the number of times that the turn signal 32 flashes is smaller than the minimum number of times of flashing), the steering ECU 40 may transmit the turn signal flashing command to the meter ECU 30 for the minimum flashing time period so as to ensure the minimum number of times of flashing. In this case, the driver is only required to instantaneously perform the shallow pressing operation on the turn signal lever 41 to intermittently flash the turn signal 32 by a set number of times (minimum number of times of flashing). Further, when the first switch 411L (411R) is turned on, the steering ECU 40 may transmit the turn signal flashing command to the meter ECU 30 for a time period corresponding to a set number of times so that the turn signal 32 intermittently flashes the set number of times regardless of the time period in which the first switch 411L (411R) is turned on.

Further, the steering ECU 40 intermittently flashes the turn signal 32 arranged on a side corresponding to the operation direction while the second switch 412L (412R) is turned on. In this case, while the second switch 412L (412R) is turned on, the steering ECU 40 transmits, to the meter ECU 30, a turn signal flashing command for designating the operation direction (right/left direction). While the meter ECU 30 receives the turn signal flashing command, the meter ECU 30 intermittently flashes the turn signal 32 arranged on the side corresponding to the designated direction. Therefore, when the deep pressing operation is performed on the turn signal lever 41, the intermittently flashing of the turn signal 32 continues from when the deep pressing operation is started to when the returning operation is performed on the turn signal lever 41 or on the steering wheel.

The driving support ECU 10 receives the shallow pressing operation monitoring signal and the deep pressing operation monitoring signal. The driving support ECU 10 measures an ON duration time period of the shallow pressing operation monitoring signal (duration time period during which the first switch 411L (411R) is turned on, that is, duration time period during which the turn signal lever 41 is held at the first operation position P1L (P1R)), and determines whether or not the ON duration time period is equal to or longer than an assist request confirmation time period (e.g., one second) set in advance. When the ON duration time period of the shallow pressing operation monitoring signal is equal to or longer than the assist request confirmation time period, the driving support ECU 10 determines that the driver is making a request for the lane change assist.

Therefore, the shallow pressing operation on the turn signal lever 41 is an operation for requesting the lane change assist request operation for the driver to request the lane change assist. When the shallow pressing operation continues for the assist request confirmation time period or more, the driver's lane change assist request is confirmed. That is, when the shallow pressing operation continues for the assist request confirmation time period or more, the driving support ECU 10 detects the driver's lane change assist request. The lane change assist control to be described later is started based on the detection of the lane change assist request. In the following, the shallow pressing operation continuing for the assist request confirmation time period or more is specifically referred to as a "request confirmation operation".

Further, when the deep pressing operation monitoring signal is turned on (when the turn signal lever 41 is operated to the second operation position P2L (P2R)), the driving support ECU 10 does not execute the steering assist control (LTA and LCA to be described later). That is, when the deep pressing operation monitoring signal is turned on while the steering assist control is executed, the driving support ECU 10 stops the steering assist control, and does not start the steering assist control under a situation in which the deep pressing operation monitoring signal is turned on (in the turned on state)

In this embodiment, when the deep pressing operation is performed on the turn signal lever 41, the turn signal lever 41 is locked at that position even when the driver releases the operation force. Alternatively, even when the deep pressing operation is performed, similarly to the shallow pressing operation, the turn signal lever 41 may be automatically returned to the neutral position by a mechanical returning mechanism (not shown) when the driver releases the operation force. In the case of this configuration, even when the second switch 412L (412R) is switched from the ON state to the OFF state, the steering ECU 40 continues to transmit the turn signal flashing command of the turn signal 32 arranged on the side corresponding to the operation direction until the steering wheel is detected to return to the vicinity of the neutral position based on the steering angle.

The hands-off sensor 42 is a sensor configured to detect that the driver is not holding the steering wheel. The hands-off sensor 42 transmits a hands-off detection signal representing whether or not the driver is holding the steering wheel to the driving support ECU 10 via the CAN 100. While the lane change assist control and the lane trace assist control are executed, when a state in which the driver does not hold the steering wheel continues for a hands-off determination time period set in advance or more, the driving support ECU 10 determines that a "hands-off state" holds true. When the driving support ECU 10 determines that the hands-off state holds true, the driving support ECU 10 sounds the buzzer 13 to alert the driver. This alerting is referred to as a "hands-off warning".

The engine ECU 50 is connected to an engine actuator 51. The engine actuator 51 is an actuator for changing an operation state of an internal combustion engine 52. In this embodiment, the internal combustion engine 52 is a gasoline fuel injection, spark ignition, multi-cylinder engine, and includes a throttle valve for adjusting an intake air amount. The engine actuator 51 includes at least a throttle valve actuator for changing an opening degree of the throttle valve. The engine ECU 50 can drive the engine actuator 51, thereby changing a torque generated by the internal combustion engine 52. The torque generated by the internal combustion engine 52 is transmitted to drive wheels (not shown) via a transmission (not shown). Thus, the engine ECU 50 can control the engine actuator 51 to control a driving force of the own vehicle, thereby changing an acceleration state (acceleration).

The brake ECU 60 is connected to a brake actuator 61. The brake actuator 61 is provided in a hydraulic circuit between a "master cylinder (not shown) configured to pressurize a working fluid in response to a stepping force on a brake pedal" and "friction brake mechanisms 62 provided at the front/rear left/right wheels". The friction brake mechanism 62 includes a brake disk 62a fixed to the wheel and a brake caliper 62b fixed to a vehicle body. The brake actuator 61 is configured to adjust a hydraulic pressure supplied to a wheel cylinder included in the brake caliper 62b in accordance with an instruction from the brake ECU 60 to use the hydraulic pressure to operate the wheel cylinder, thereby pressing a brake pad against the brake disk 62a and generating a friction braking force. Thus, the brake ECU 60 can control the brake actuator 61, thereby controlling the braking force of the own vehicle.

The navigation ECU 70 includes a GPS receiver 71 configured to receive a GPS signal for detecting a current position of the own vehicle, a map database 72 having map information and the like stored therein, and a touch panel (touch panel-type display) 73. The navigation ECU 70 identifies the position of the own vehicle at the current time point based on the GPS signal, and performs various types of calculation processing based on the position of the own vehicle and the map information and the like stored in the map database 72, to thereby perform route guidance with use of the touch panel 73.

The map information stored in the map database 72 includes road information. The road information includes parameters (e.g., road curvature radius or curvature representing the degree of the curve of the road, and the road lane width) representing the shape of the road for each section of the road. Further, the road information includes road type information for enabling distinction of whether or not the road is a road for exclusive use by automobiles, and information on the number of lanes.

<Control Processing Performed by Driving Support ECU 10>

Next, control processing performed by the driving support ECU 10 is described. Under a situation in which both of the lane trace assist control and the adaptive cruise control are being executed, when the lane change assist request is accepted, the driving support ECU 10 executes the lane change assist control. In view of this, the lane trace assist control and the adaptive cruise control are firstly described.

<Lane Trace Assist Control (LTA)>

The lane trace assist control provides/generates the steering torque to the steering mechanism so that the position of the own vehicle is maintained in the vicinity of the target travel line inside a "lane in which the own vehicle is traveling", thereby assisting the steering operation of the driver. In this embodiment, the target travel line is the lane center line CL, but a line offset in the road width direction by a predetermined distance from the lane center line CL can also be adopted as the target travel line.

In the following, the lane trace assist control is referred to as an "LTA". The LTA is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210) although the LTA itself has various names. Thus, a brief description on the LTA is now given.

The driving support ECU 10 is configured to carry out the LTA when the LTA is requested by the operation on the setting operation unit 14. When the LTA is requested, the driving support ECU 10 calculates a target steering angle $\theta lta^*$ in accordance with Expression (1) based on the above-mentioned lane-related vehicle information (Cu, Dy, and $\theta y$) every time a predetermined time (calculation period) elapses.

$$\theta lta^* = Klta1 \cdot Cu + Klta2 \cdot \theta y + Klta3 \cdot Dy + Klta4 \cdot \Sigma Dy \quad (1)$$

In Expression (1), Klta1, Klta2, Klta3, and Klta4 are control gains. The first term on the right-hand side is a steering angle component that is determined in accordance with the curvature Cu of the road and acts in a feed-forward manner. The second term on the right-hand side is a steering angle component that acts in the feed-back manner so that the yaw angle $\theta y$ is decreased (so that the difference of the direction of the own vehicle with respect to the lane center line CL is decreased). That is, the second term on the right-hand side is a steering angle component calculated by feed-back control with the target value of the yaw angle $\theta y$ being set to zero. The third term on the right-hand side is a steering angle component that acts in a feed-back manner so that the lateral difference Dy, which is a positional gap (positional difference) between the own vehicle and the lance center line CL in the road width direction, is decreased. That is, the third term on the right-hand side is a steering angle component calculated by feed-back control with the target value of the lateral difference Dy being set to zero. The fourth term on the right-hand side is a steering angle component that acts in a feed-back manner so that an integral value $\Sigma Dy$ of the lateral difference Dy is decreased. That is, the fourth term on the right-hand side is a steering angle component calculated by feed-back control with the target value of the integral value $\Sigma Dy$ being set to zero.

A target steering angle $\theta lta^*$ becomes an angle to have the own vehicle travel toward the left direction, for example, when the lane center line CL curves to the left (direction), when the own vehicle is laterally shifted/deviated in the right direction from the lane center line CL, and when the own vehicle is facing to the right (direction) with respect to the lane center line CL. Further, a target steering angle $\theta lta^*$ becomes an angle to have the own vehicle travel toward the right direction, when the lane center line CL curves to the right (direction), when the own vehicle is laterally shifted/deviated in the left direction from the lane center line CL, and when the own vehicle is facing to the left (direction)

with respect to the lane center line CL. Therefore, when Expression (1) is calculated, the calculation is only required to be performed with use of symbols corresponding to the right/left direction.

The driving support ECU 10 outputs/transmits, to the EPS ECU 20, a command signal representing the target steering angle $\theta lta^*$ that is the calculation result. The EPS ECU 20 controls the drive of the steering motor 22 so that the steering angle follows (becomes equal to) the target steering angle $\theta lta^*$. In this embodiment, the driving support ECU 10 outputs the command signal representing the target steering angle $\theta lta^*$ to the EPS ECU 20, but the driving support ECU 10 may calculate a target torque for obtaining the target steering angle $\theta lta^*$, and output, to the EPS ECU 20, a command signal representing the target torque that is the calculation result.

The LTA is only used to support the driver's driving operation so that the travel position of the own vehicle follows the lane center line CL. Therefore, even when the LTA is executed, hands-off driving is not allowed, and the driver is required to hold the steering wheel (note that steering wheel operation is unnecessary).

The above is the outline of the LTA.

<Adaptive Cruise Control (ACC)>

When a preceding vehicle traveling immediately ahead of the own vehicle is present, the adaptive cruise control has the own vehicle follow the preceding vehicle while maintaining an inter-vehicle distance between the preceding vehicle and the own vehicle to a predetermined distance based on the surrounding information. When there is no preceding vehicle, the adaptive cruise control has the own vehicle travel at a constant setting vehicle speed. In the following, the adaptive cruise control is referred to as an "ACC". The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description on the ACC is now given.

The driving support ECU 10 is configured to carry out the ACC when the ACC is requested by the operation on the setting operation unit 14. That is, the driving support ECU 10 is configured to select a following-objective-vehicle based on the surrounding information acquired from the surrounding sensors 11 when the ACC is requested. For example, the driving support ECU 10 determines whether or not a relative position of the detected object (n) identified by a lateral distance Daccy(n) and an inter-vehicle distance Daccx(n) of the object (n) is in a following-objective-vehicle area defined in advance. The following-objective-vehicle area is so defined that the lateral distance decreases as the inter-vehicle distance increases. Then, the driving support ECU 10 selects the object (n) as the following-objective-vehicle when the relative position of the object (n) is in the following-objective-vehicle area for a period equal to or more than a predetermined period.

Further, the driving support ECU 10 calculates a target acceleration Gacc* in accordance with any one of Expression (2) and Expression (3). In Expression (2) and Expression (3), Vaccx(a) is a relative speed of a following-objective-vehicle (a), Kacc1 and Kacc2 are predetermined positive gains (coefficients), and ΔDacc is an inter-vehicle distance difference (=Daccx(a)−Dacc*) acquired by subtracting the "target inter-vehicle distance Dacc* from an inter-vehicle distance Daccx(a) of the following-objective-vehicle (a)". The target inter-vehicle distance Dacc* is calculated by multiplying a target inter-vehicle period Tacc* set by the driver using the setting operation unit 14 by the vehicle speed V of the own vehicle (that is, Dacc*=Tacc*·V).

The driving support ECU 10 uses Expression (2) to determine the target acceleration Gacc* when the value (Kacc1·ΔDacc+Kacc2·Vaccx(a)) is positive or "0". Kacca1 is a positive gain (coefficient) for acceleration, and is set to a value equal to or less than "1".

The driving support ECU 10 uses Expression (3) to determine the target acceleration Gacc* when the value (Kacc1·ΔDacc+Kacc2·Vaccx(a)) is negative. Kaccd1 is a gain (coefficient) for deceleration, and is set to "1" in this example.

$$Gacc^*(\text{for cceleration})=Kacca1\cdot(Kacc1\cdot\Delta Dacc+Kacc2\cdot Vaccx(a)) \quad (2)$$

$$Gacc^*(\text{for eceleration})=Kaccd1\cdot(Kacc1\cdot\Delta Dacc+Kacc2\cdot Vaccx(a)) \quad (3)$$

When no object is present in the following-objective-vehicle area, the driving support ECU 10 determines the target acceleration Gacc* based on a "target speed set in accordance with the target inter-vehicle distance Tacc" and the vehicle speed V so that the vehicle speed V matches the set target speed.

The driving support ECU 10 uses the engine ECU 50 to control the engine actuator 51, and, depending on necessity, uses the brake ECU 60 to control the brake actuator 61 so that the acceleration of the own vehicle matches (becomes equal to) the target acceleration Gacc*.

Further, during the ACC, the driving support ECU 10 reads, from the navigation ECU 70, information representing the curvature of the road that is a predetermined distance ahead of the position of the own vehicle (prefetches the road curvature), and sets an upper-limit speed of the own vehicle, which decreases as the curvature increases (as the curve becomes steeper), to thereby limit the vehicle speed so that the vehicle speed of the own vehicle does not exceed the upper-limit speed. In the following, such control is referred to as "speed management".

The above is the outline of the ACC.

<Lane Change Assist Control (LCA)>

The lane change assist control refers to the following control. After the surrounding of the own vehicle is monitored and it is determined that the own vehicle can safely change lanes, the lane change assist control provides/generates a steering torque to the steering mechanism so that the lane change assist control has the own vehicle move from the lane in which the own vehicle is currently traveling to the adjacent lane while monitoring the surrounding of the own vehicle. Thus, the driver's steering operation (lane change operation) is assisted. Therefore, the lane change assist control can have the own vehicle change lanes in which the own vehicle travels without the driver's steering operation (steering wheel operation). In the following, the lane change assist control is referred to as an "LCA".

Similarly to the LTA, the LCA is control of a lateral position with respect to the lane of the own vehicle, and is executed in place of the LTA when the lane change assist request is accepted while the LTA and the ACC are being executed. In the following, the LTA and the LCA are collectively referred to as "steering assist control", and the state of the steering assist control is referred to as "steering assist control state".

The steering assist control state changes depending on the travel state of the own vehicle, the driver's operation state, the lane recognition state obtained by the camera sensor 12, the surrounding monitoring state obtained by the surrounding sensors 11, and the like.

The steering assist control state is roughly divided into an LTA-OFF state, an LTA-ON state, an LCA standby state, and an LCA actuation state. The steering assist control state basically is changed as follows. At the beginning of a time when an ignition switch is turned on, the driving support ECU 10 sets the steering assist control state to the LTA-OFF state. At a stage at which LTA-ON condition is established, the driving support ECU 10 changes the steering assist control states from the LTA-OFF state to the LTA-ON state. Further, when the lane change assist request is detected in the LTA-ON state and an LCA start acceptance condition is established, the driving support ECU 10 starts the LCA. The states of the LCA is divided into the LCA standby state and the LCA actuation state. The steering assist control state is changed from the LTA-ON state through the LCA standby state to the LCA actuation state. When the LCA is completed, the driving support ECU 10 returns the steering assist control state to the LTA-ON state.

<LTA-ON Condition>

The LTA-OFF state refers to a state in which the execution of the LTA is inhibited. During the LTA-OFF state, the driving support ECU 10 determines whether or not the LTA-ON condition set in advance is established, and executes the LTA when the LTA-ON condition is established. The state in which the LTA is executed is the LTA-ON state. For example, the LTA-ON condition is established when all of the following conditions 1-1 to 1-5 are established.

1-1. Execution of the LTA has been selected by the setting operation unit 14.

1-2. The ACC is being executed.

1-3. The vehicle speed is within a predetermined vehicle speed range.

1-4. The white line has been recognized.

1-5. The deep pressing operation on the turn signal lever 41 has not been detected.

The LTA-ON condition is not limited to the above-mentioned condition, and can be set as appropriate.

Further, in the LTA-ON state, when the request confirmation operation on the turn signal lever 41 has just been detected, the driving support ECU 10 changes the steering assist control states from the LTA-ON state to the LCA standby state. In the LCA standby state, the own vehicle is not laterally moved toward the adjacent lane, but the steering control is performed with use of a target steering angle calculated by an expression similar to that used in the LTA.

<LCA Start Acceptance Condition>

When the steering assist control state is changed to the LCA standby state, the driving support ECU 10 determines whether or not the LCA start acceptance condition is established. When the LCA start acceptance condition is established, the driving support ECU 10 changes the steering assist control states from the LTA-ON state to the LCA standby state. For example, the LCA start acceptance condition is established when all of the following conditions 2-1 to 2-4 are established. The lane in which the own vehicle is traveling, which is the lane before the lane change, is referred to as an "original lane", and the lane being the lane change destination (lane adjacent to the original lane) is referred to as a "target lane".

2-1. The execution of the LCA has been selected by the setting operation unit 14.

2-2. The white line at a side corresponding to the turn signal operation direction (white line serving as a boundary between the original lane and the target lane) is a broken line.

2-3. The result of determining whether or not the LCA can be executed based on the monitoring of the surrounding is YES. That is, no object (another vehicle or the like) that becomes an obstacle impeding the lane change is detected by the surrounding sensors 11, and it is determined that the own vehicle can safely change lanes).

2-4. The road (on which the own vehicle is traveling) is a road for exclusive use by automobiles (road type information acquired from the navigation ECU 70 represents that the road is for exclusive use by automobiles).

For example, the condition 2-3 is established when the inter-vehicle distance between the own vehicle and another vehicle that travels in the target lane is appropriately ensured in consideration of a relative speed therebetween.

The LCA start acceptance condition is not limited to the above-mentioned condition, and can be set as appropriate.

When the driving support ECU 10 changes the steering assist control states to the LCA standby state, the driving support ECU 10 sounds the buzzer 13 for a short time period to notify the driver of the acceptance of the lane change assist request. Further, when the driving support ECU 10 changes the steering assist control states to the LCA standby state, the driving support ECU 10 continues intermittently flashing of the turn signal 32 (transmits the turn signal flashing command to the meter ECU 30), which was started upon the operation on the turn signal lever 41.

<Calculation of Target Trajectory>

Figure 5:
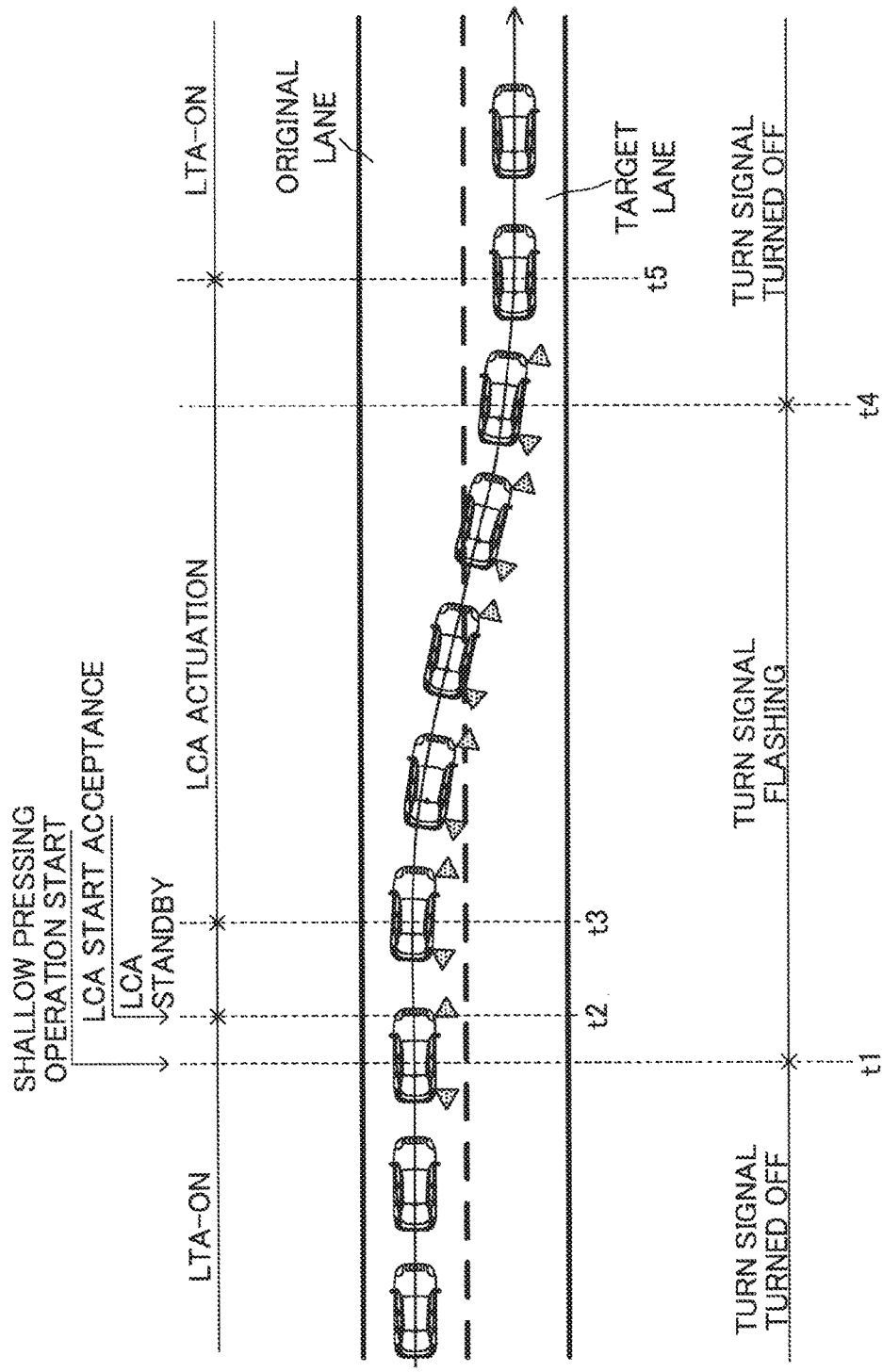
FIG. 5 is a diagram for illustrating a steering assist control state, a trajectory of an own vehicle, and an actuation state of a turn signal.

When the driving support ECU 10 executes the LCA, the driving support ECU 10 calculates a target trajectory of the own vehicle based on the lane information at the current time point, which is supplied from the camera sensor 12, and on the vehicle state of the own vehicle. The target trajectory is a trajectory along which the own vehicle is to be moved for the target lane change time period from the lane (original lane) in which the own vehicle is currently traveling to the center position in the width direction (referred to as a "final target lateral position") of the lane (target lane) specified by the lane change assist request direction, which is adjacent to the original lane. The target trajectory has, for example, a shape as illustrated in FIG. 5. The target trajectory is represented with use of a target lateral position $y(t)$ of the own vehicle with respect to the lane center line CL of the original lane (see FIG. 3), wherein "t" is an elapsed time (period) from the (actuation) start time point of the LCA.

In this embodiment, the target lane change time period is set to be variable in proportion to the distance of moving the own vehicle in the lateral direction to the final target lateral position (hereinafter referred to as a "necessary lateral distance"). When the lane width is 3.5 m as in the case of general roads, the target lane change time period is set to, for example, 8.0 seconds. This example corresponds to a case in which the own vehicle is positioned on the lane center line CL of the original lane at the start of the LCA. When the lane width is, for example, 4.0 m, the target lane change time period is set to a value corresponding to the lane width, in this example, to 9.1 seconds ($=8.0 \times 4.0/3.5$).

Further, when the lateral-direction position of the own vehicle at the start of the LCA is shifted to the lane change side with respect to the lane center line CL of the original lane, the target lane change time period is set to be decreased as the shift amount (lateral difference Dy) is increased. On the other hand, when the lateral-direction position of the own vehicle at the start of the LCA is shifted to the opposite side of the lane change side with respect to the lane center line CL of the original lane, the target lane change time period is set to be increased as the shift amount (lateral difference Dy) is increased. For example, when the shift amount is 0.5 m, the increase/decrease adjustment amount of the target lane change time period may be 1.14 seconds (=8.0×0.5/3.5).

The driver can select the reference value of the target lane change time period (referred to as "reference lane change time period") with use of the setting operation unit 14. The reference lane change time period is a reference value of the target lane change time period when, for example, the lane width is 3.5 m as in the case of general roads (when a necessary lateral distance required for laterally moving the own vehicle to the final target lateral position is 3.5 m). For example, the driver can use the setting operation unit 14 to select an LCA time mode from a standard time mode, a short time mode, and a long time mode.

The driving support ECU 10 stores the LCA time mode set h use of the setting operation unit 14, and adjusts/modifies the reference lane change time period set in the selected LCA time mode based on the lane width, the shift amount, and the like to calculate the target lane change time period. The reference lane change time period is set to, for example, 8.0 seconds when the standard time mode is selected, 7.0 seconds when the short time mode is selected, and 9.0 seconds when the long time mode is selected. As the reference lane change time period is increased, the movement speed in the lateral direction (road width direction) of the own vehicle during the LCA is decreased, and the target trajectory becomes smoother.

The patterns for variably setting the reference lane change time period are not limited to the 3 patterns, and may be 2 patterns or 4 patterns or more. Further, the reference lane change time period may be a fixed value except for a case in which Modification Example 2 to be described later is executed. Further, the value of the reference lane change time periods are not limited to the above-mentioned values, and can be set to any values.

FIG. 5 is an illustration of an example of the trajectory of the own vehicle when the LCA is executed. At a time t1, the intermittently-flashing of the turn signal 32 is started in response to the shallow pressing operation on the turn signal lever 41. Then, at a time t2 at which a duration time period during which the shallow pressing operation monitoring signal is turned on, that is, the duration time period of the shallow pressing operation reaches the assist request confirmation time period, the driving support ECU 10 detects/regards the shallow pressing operation as the request confirmation operation. When the LCA start acceptance condition is established, the driving support ECU 10 has the buzzer output/generate a sound representing that the lane change assist request is accepted, and substantially starts the LCA (actual control for changing the lateral position of the own vehicle) after an elapse of a predetermined time period (referred to as "standby time period") from the acceptance of the lane change assist request. The LCA standby state corresponds to a period from when the driving support ECU 10 accepts the lane change assist request to when the LCA is substantially started.

In this embodiment, a target lateral position y is calculated in accordance with a target lateral position function y(t) expressed by Expression (4). The lateral position function y(t) is a fifth-order function using the elapsed time period t.

$$y(t)=a \cdot t^5 + b \cdot t^4 + c \cdot t^3 + d \cdot t^2 + e \cdot t + f \quad (4)$$

In Expression (4), the constants a, b, c, d, e, and f are determined based on the travel state of the own vehicle, the lane information, the target lane change time period, and the like at the time of the calculation. In this embodiment, a vehicle model stored in advance is used, and the travel state of the own vehicle, the lane information, and the target lane change time period are input to the vehicle model. Thus, the above-mentioned constants a, b, c, d, e, and f are calculated so that a smooth target trajectory can be obtained. The calculated constants a, b, c, d, e, and f are substituted into Expression (4) to obtain the target lateral position function y(t). The elapsed time period t from the LCA start time is substituted into the target lateral position function y(t), and thus the target lateral position at that time point can be obtained. In this case, f represents an initial lateral position of the own vehicle when t is equal to 0, that is, when the LCA is started, and hence f is set to a value equal to the lateral difference Dy.

The target lateral position y can be set by any method. For example, other than the above-mentioned calculation method, the driving support ECU 10 may store in advance a plurality of lateral position functions y(t), each having the constants a to f set in accordance with the target lane change time period, for every necessary lateral distance required for laterally moving the own vehicle to the final target lateral position, and the driving support ECU 10 may select, from the plurality of lateral position functions y(t), a lateral position function y(t) corresponding to the necessary lateral distance and the target lane change time period used when the LCA is started.

Further, the target lateral position y is not required to be calculated with use of the fifth-order function, and may be obtained with use of a function set as appropriate.

<Calculation of Target Steering Angle>

The driving support ECU 10 is executing the LTA before the LCA is started. In the LTA, the target steering angle is calculated as described above, and the steering torque is generated so that the actual steering angle coincides with (matches) the target steering angle. Also in the LCA, similarly to the LTA, the driving support ECU 10 calculates the target steering angle, and the steering torque is generated so that the actual steering angle coincides with (matches) the target steering angle.

When the target steering angle is calculated for the LCA, it is only required to change the target values of the curvature, the yaw angle, and the lateral difference of the calculation expression for the target steering angle in the LTA. That is, in the LTA, the target value of the curvature is set to the curvature of the lane in which the own vehicle travels, and the target values of the yaw angle and the lateral difference are set to zero. In contrast, in the LCA, a target curvature Cu*, a target yaw angle θy*, and a target lateral difference Dy* are determined based on the shape of the target trajectory represented by Expression (4).

The driving support ECU 10 calculates a target steering angle θlca* as a control amount of the LCA based on Expression (5) every time a predetermined time (calculation period) elapses.

$$\theta lca^* = Klca1 \cdot Cu^* + Klca2 \cdot (\theta y^* - \theta y) + Klca3 \cdot (Dy^* - Dy) + Klca4 \cdot \Sigma(Dy^* - Dy) \quad (5)$$

Values in the lane-related vehicle information (Cu, Dy, and θy) at the current time point (at the time of calculation) are used for θy and Dy in Expression (5). Klca1, Klca2, Klca3, and Klca4 are control gains.

The first term on the right-hand side is a steering angle component that acts in a feed-forward manner and is determined in accordance with the target curvature Cu* determined based on the shape of the target trajectory. The second term on the right-hand side is a steering angle component that acts in the feed-back manner so that the difference between the target yaw angle θy* determined based on the shape of the target trajectory and the actual yaw angle θy is decreased. The third term on the right-hand side is a steering angle component that acts in a feed-back manner so that the difference between the target lateral difference Dy* determined based on the shape of the target trajectory and the actual lateral difference Dy is decreased. The fourth term on the right-hand side is a steering angle component that acts in a feed-back manner so that an integral value Σ(Dy*−Dy) of the difference between the target lateral difference Dy* and the actual lateral difference Dy is decreased. In this manner, the target steering angle θlca* is calculated as the control amount of the LCA, and thus smooth transition from the LTA to the LCA can be achieved.

<LCA Start Condition>

When the above-mentioned standby time period elapses after changing the steering assist control state from the LTA-ON state to the LCA standby state, the driving support ECU 10 substantially starts the actuation of the LCA. Therefore, an LCA start condition is established when the elapsed time period from changing the steering assist control state to the LCA standby state reaches the standby time period.

When the LCA start condition is established, the driving support ECU 10 changes the steering assist control states to the LCA actuation state to substantially start the LCA. While the LCA is executed, the driving support ECU 10 repeats the calculation of the target steering angle θlca*, and transmits a steering command representing the target steering angle θlca* to the EPS ECU 20. In this manner, the own vehicle travels along the target trajectory to change lanes.

As illustrated in FIG. 5, when the actuation of the LCA is started at a time t3, the own vehicle moves toward the target lane corresponding to the turn signal operation direction, and crosses the white line (broken line) serving as the boundary between the original lane and the target lane to enter the target lane.

<LCA Completion Condition>

The driving support ECU 10 completes the LCA when an LCA completion condition is established. The LCA completion condition is established when the elapsed time period from the start of the LCA reaches the target lane change time period and a turn signal turning-off condition is established. When the elapsed time period from the start of the LCA reaches the target lane change time period, it is considered that the own vehicle has reached the final target lateral position (center position in the width direction of the target lane). Therefore, the LTA can be smoothly started with the lane after the lane change serving as the control target lane to determine the target travel line.

<Turn Signal Turning-Off Condition>

When the turn signal turning-off condition is established, the driving support ECU 10 turns off the turn signal 32 that has been intermittently flashed during the LCA. The turn signal turning-off condition is established when both of the following conditions 3-1 and 3-2 are established.

3-1. The own vehicle has already crossed the white line.

3-2. The lateral-direction distance between the current position of the own vehicle and the final target lateral position is equal to or smaller than a turning-off allowance distance.

Figure 6:
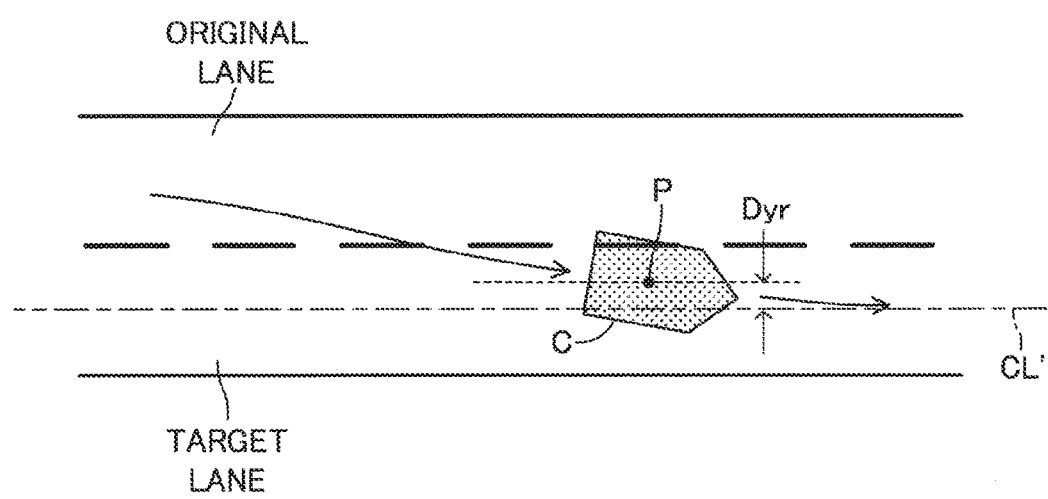
FIG. 6 is a diagram for illustrating a turning-off allowance distance.

For example, the condition 3-1 is established when it is detected that the reference point P of the own vehicle has crossed the white line (broken line) serving as the boundary between the original lane and the target lane. Further, the condition 3-2 is established when it is detected a state in which, as illustrated in FIG. 6, a lateral-direction distance Dyr from the reference point P of the own vehicle C to a lane center line CL' (center line in the width direction) of the target lane becomes equal to or smaller than a turning-off allowance distance Doff (e.g., 50 cm) that is larger than zero. The lateral-direction distance Dyr is a distance in the lane width direction from the current position of the own vehicle to the final target position, that is, the remaining distance in the lane width direction required for completing the LCA, and hence this lateral-direction distance Dyr is hereinafter referred to as "remaining distance Dyr".

The driving support ECU 10 calculates, every time a predetermined time (calculation period) elapses, the remaining distance Dyr from the reference point P of the own vehicle to the lane center line CL' of the target lane, and compares the remaining distance Dyr with the turning-off allowance distance Doff, to thereby determine whether or not the above-mentioned condition 3-2 is established. The reference point P used for the determination on whether or not the condition 3-1 is established is not limited to the position of the center of gravity, and is only required to be a specific position (specific point) of the own vehicle set in advance. Further, in determining whether or not the reference point P has crossed the white line, it is only required to determine whether or not the reference point P has crossed a line determined in advance, for example, an inner line, an outer line, or a center line of the white line.

Accordingly, the turn signal 32 has already been turned off when the LCA is completed.

Further, when a control stop condition or an LCA cancel condition to be described later is established to end the LCA in the middle (before the LCA is completed), the turn signal 32 is turned off regardless of whether or not the conditions 3-1 and 3-2 are satisfied.

<LCA Restart Condition>

In the LCA actuation state, when the following LCA restart condition is established, the driving support ECU 10 changes the steering assist control states from the LCA actuation state to the LCA standby state. The LCA restart condition is established when the request confirmation operation of the turn signal lever 41 is detected, the above-mentioned LCA start acceptance condition is established (all of the above-mentioned conditions 2-1 to 2-4 are established), and the following condition 2-5 is established.

2-5. The turn signal turning-off condition has been established.

When the LCA restart condition is established, the driving support ECU 10 sets the adjacent lane corresponding to the direction of the request confirmation operation on the turn signal lever 41 as a new target lane.

<Control Stop Condition>

Further, in the LTA-ON state, the LCA standby state, and the LCA actuation state, when the driving support ECU 10 detects that the above-mentioned LTA-ON condition is not established (any one of the above-mentioned conditions 1-1 to 1-5 is not established), the driving support ECU 10 immediately changes the steering assist control states to the LTA-OFF state. In the following, a condition for changing the steering assist control state to the LTA-OFF state is referred to as a "control stop condition".

Further, another control stop condition is provided. In the LCA standby state and the LCA actuation state, when any one of the following conditions is established, the driving support ECU 10 changes the steering assist control states to the LTA-OFF state.

4-1. Input of a steering torque that is equal to or larger than a threshold value is detected due to the operation performed by the driver.

4-2. A turn signal operation in a reverse direction to the lane change direction is detected.

4-3. The setting of the LCA is set to OFF (non-execution) by the setting operation unit 14.

<LCA Cancel Condition>

Further, in the LCA standby state and the LCA actuation state, when the driving support ECU 10 detects that any one of the following conditions is established, the driving support ECU 10 immediately changes the steering assist control states to the LTA-ON state. In this manner, the LTA is started instead of the LCA as the steering assist control. In the following, a condition for causing the steering assist control state to the LTA-ON state is referred to as an "LCA cancel condition".

5-1. The white line corresponding to the turn signal operation direction is not a broken line.

5-2. The result of determining whether or not the LCA can be executed due to the monitoring of the surrounding is NO.

Figure 7:
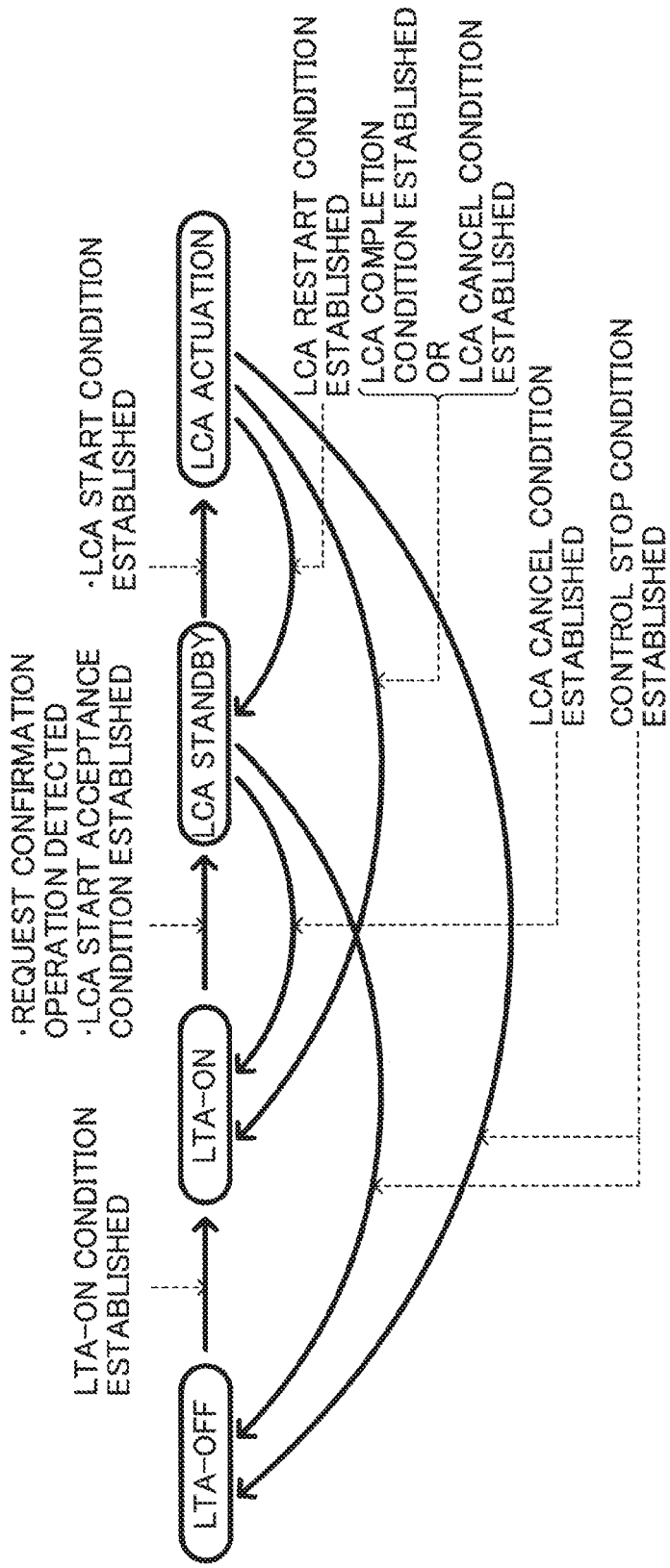
FIG. 7 is a diagram for illustrating transition of the steering assist control state.

FIG. 7 is a diagram for illustrating the transition of the above-mentioned steering assist control state. In each of the steering assist control states (LTA-OFF state, LTA-ON state, LCA standby state, and LCA actuation state), the driving support ECU 10 determines whether or not the above-mentioned conditions for each control state are established, and changes the steering assist control states based on the determination result.

<Turn Signal Control>

Figure 8:
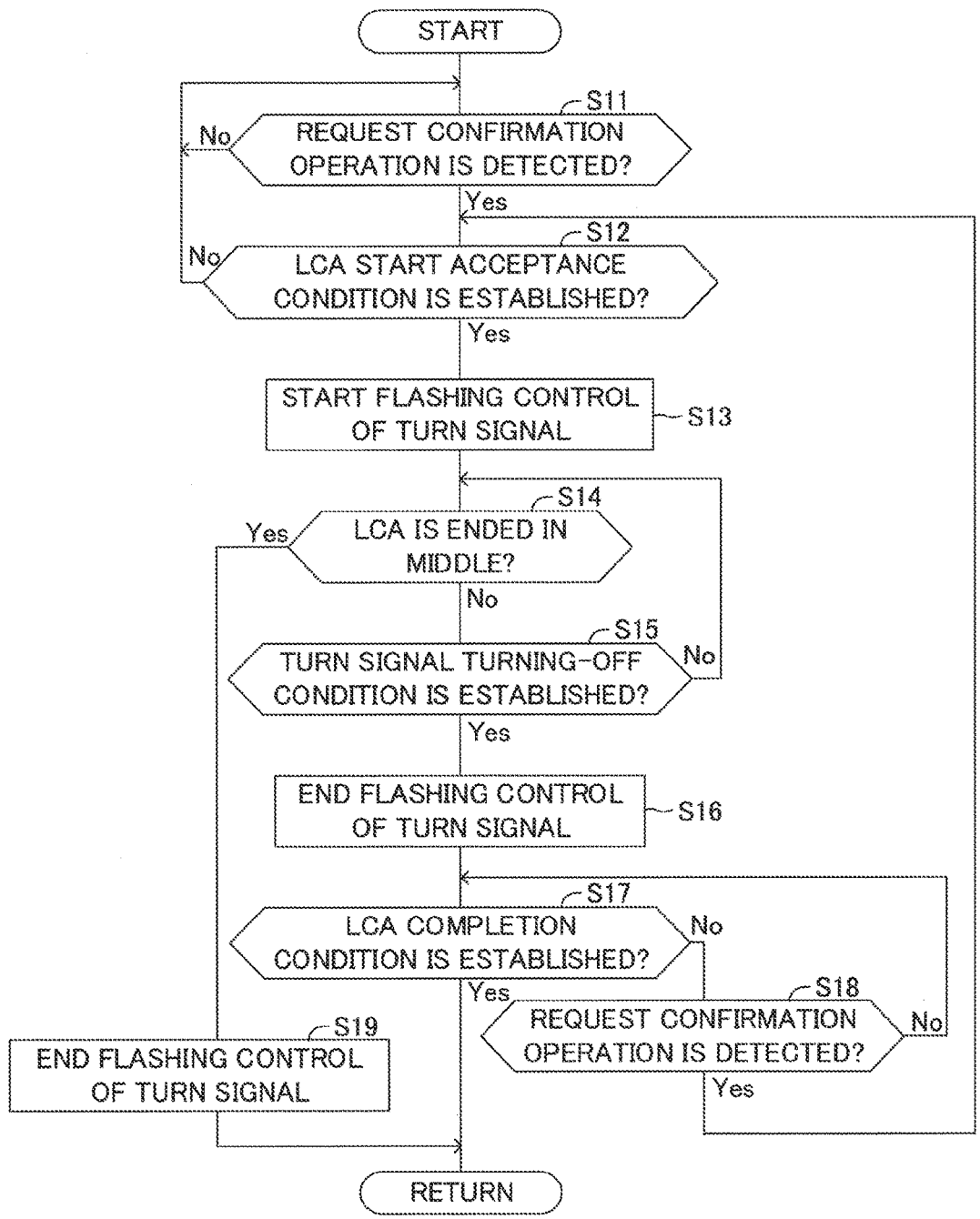
FIG. 8 is a flowchart for illustrating a turn signal control routine of the embodiment.

Next, turn signal control to be executed regarding the LCA is described. FIG. 8 is an illustration of a turn signal control routine executed by the driving support ECU 10. When the LTA is being executed (LTA-ON state), the driving support ECU 10 starts the turn signal control routine.

When the turn signal control routine is activated, the driving support ECU 10 determines whether or not the request confirmation operation is detected in Step S11. Specifically, the driving support ECU 10 determines whether or not the ON duration time period of the shallow pressing operation monitoring signal, which is transmitted from the steering ECU 40, is equal to or larger than the assist request confirmation time period. When the duration time period of the shallow pressing operation performed by the driver on the turn signal lever 41 reaches the assist request confirmation time period, the driving support ECU 10 detects/regards the shallow pressing operation as the request confirmation operation.

The driving support ECU 10 repeats the determination in Step S11 every time a predetermined time (calculation period) elapses, and when the request confirmation operation is detected (S11: Yes), subsequently in Step S12, the driving support ECU 10 determines whether or not the LCA start acceptance condition is established. When the LCA start acceptance condition is not established, the driving support ECU 10 returns the processing to Step S11 to repeat the above-mentioned processing.

The driving support ECU 10 repeats the above-mentioned processing, and when the LCA start acceptance condition is established (S12: Yes), in Step S13, the driving support ECU 10 starts the flashing control of the turn signal 32. Specifically, the driving support ECU 10 starts to transmit the turn signal flashing command to the meter ECU 30. The turn signal flashing command also includes information for identifying the lane change direction (any one of right and left directions). The meter ECU 30 intermittently flashes the turn signal 32 on a side corresponding to the lane change direction in accordance with the turn signal flashing command transmitted from the driving support ECU 10.

Therefore, after the LCA start acceptance condition is established (S12: Yes), the turn signal 32 continues to be intermittently flashed. In this manner, even when the driver releases the operation force applied to the turn signal lever 41 (separates his or her hand from the turn signal lever 41), the turn signal 32 can continue to be intermittently flashed.

The driving support ECU 10 executes the steering assist control in parallel with the turn signal control routine, and changes the steering assist control states from the LTA-ON state through the LCA standby state to the LCA actuation state in response to the satisfaction of the LCA start acceptance condition.

Subsequently, the driving support ECU 10 determines whether or not the LCA is terminated/ended in the middle (before the LCA is completed). Specifically, the driving support ECU 10 determines whether or not the above-mentioned control stop condition or LCA cancel condition is established. When the LCA has not been terminated/ended in the middle (before the LCA is completed) (S14: No), in Step S15, the driving support ECU 10 determines whether or not the turn signal turning-off condition is established. When the turn signal turning-off condition is not established, the driving support ECU 10 returns the processing to Step S14.

In this manner, as illustrated in FIG. 5, the own vehicle changes lanes toward the target lane while flashing the turn signal 32.

The driving support ECU 10 repeats the processing of Steps S14 and S15. When the turn signal turning-off condition is established (S15: Yes), in Step S16, the driving support ECU 10 ends the flashing control of the turn signal 32. In this case, the driving support ECU 10 stops transmitting the turn signal flashing command that has been transmitted to the meter ECU 30. In this manner, the meter ECU 30 stops intermittently flashing the turn signal 32 (if the driver is releasing the operation force applied to the turn signal lever 41).

For example, the intermittently-flashing of the turn signal 32 is stopped after the reference point P of the own vehicle crosses the white line (broken line) that is the boundary between the original lane and the target lane, and when it is detected a state in which the lateral-direction distance (remaining distance Dyr) between the current position of the own vehicle and the final target lateral position becomes equal to or smaller than the turning-off allowance distance Doff. Therefore, the LCA is continued at a time point at which the turn signal turning-off condition is established. In other words, the flashing of the turn signal 32 ends (is terminated) immediately before the LCA is completed.

Subsequently, in Step S17, the driving support ECU 10 determines whether or not the LCA completion condition is established. When the LCA completion condition is not established, in Step S18, the driving support ECU 10 determines whether or not the request confirmation operation is detected. When the request confirmation operation is not detected, the driving support ECU 10 returns the processing to Step S17, and repeats the above-mentioned processing.

Meanwhile, after the turn signal turning-off condition is established, and when the request confirmation operation is detected (818: Yes) during a period until the LCA completion condition is established (that is, a period immediately before the LCA is completed), the driving support ECU 10 returns the processing to Step S12. As described above, in the LCA actuation state, when the LCA restart condition is established, the driving support ECU 10 changes the steering assist control states from the LCA actuation state to the LCA standby state. The LCA restart condition includes a condition in which the request confirmation operation, which is one of the condition to establish the LCA start acceptance condition, is detected, and a condition in which the turn signal turning-off condition is established. In view of this, also in the turn signal control routine, the processing of Step S18 is provided so that the intermittently-flashing of the turn signal 32 can be started in response to the restart of the LCA.

When the LCA completion condition is established (S17: Yes), the driving support ECU 10 once ends the turn signal control routine. When the LCA completion condition is established, the steering assist control state is switched from the LCA actuation state to the LTA-ON state. Therefore, after the turn signal control routine is once ended, the driving support ECU 10 restarts the turn signal control routine.

Further, when the LCA is ended in the middle (before the LCA is completed) while the turn signal 32 is intermittently flashing (S14: Yes), in Step S19, the driving support ECU 10 ends the flashing control of the turn signal 32. That is, the driving support ECU 10 stops transmitting the turn signal flashing command that has been transmitted to the meter ECU 30. In this manner, the meter ECU 30 stops the flashing of the turn signal 32.

According to the lane change assist device for a vehicle of this embodiment described above, after the LCA start acceptance condition is established, even when the operation force applied to the turn signal lever 41 is released to return the turn signal lever 41 to the neutral position, the turn signal 32 continues to be intermittently flashed until the turn signal turning-off condition is established. Therefore, the driver is not required to continue the operation on the turn signal lever 41, and is also not required to perform the returning operation (releasing of the operation force) on the turn signal lever 41 in accordance with (or at) the end of the LCA. Therefore, good operability can be achieved.

Further, the turn signal turning-off condition is set/provided so that the intermittently-flashing of the turn signal 32 ends before the LCA is completed. Therefore, the driver of the own vehicle or the drivers of other vehicles can appropriately recognize the completion of the LCA in advance. As a result, the drivers can be prevented from misunderstanding that the lane change will be continued.

Further, the turn signal turning-off condition is set/provided so that the intermittently-flashing of the turn signal 32 ends after the reference point P of the own vehicle crosses the boundary line between the original lane before the lane change and the target lane being the lane change destination, and before the LCA is completed. Therefore, the intermittently-flashing of the turn signal 32 can be appropriately continued.

Further, the intermittently-flashing of the turn signal 32 is ended when the remaining distance Dyr becomes equal to or smaller than the turning-off allowance distance Doff. Therefore, the timing to end the intermittently-flashing of the turn signal 32 can be set more appropriately.

Further, when the driver intends to change lanes manually, the driver may perform the deep pressing operation on the turn signal lever 41 in the lane change direction to have the turn signal 32 intermittently-flash without starting the lane change assist. Therefore, either one of the automatic lane change and manual lane change can be selected through switching of the operation stroke on the turn signal lever 41. Therefore, very good operability can be achieved. Further, the turn signal lever 41 is used to perform the lane change assist request, and hence a special operation unit for the lane change assist request is unnecessary. Thus, the cost can be reduced, and the space can be saved.

Further, in order to accept the lane change assist request, the shallow pressing operation on the turn signal lever 41 is required to be continued for the assist request confirmation time period Tref or more. Therefore, the driver's intention to receive the lane change assist can be appropriately detected.

Modification Example 1

Figure 9:
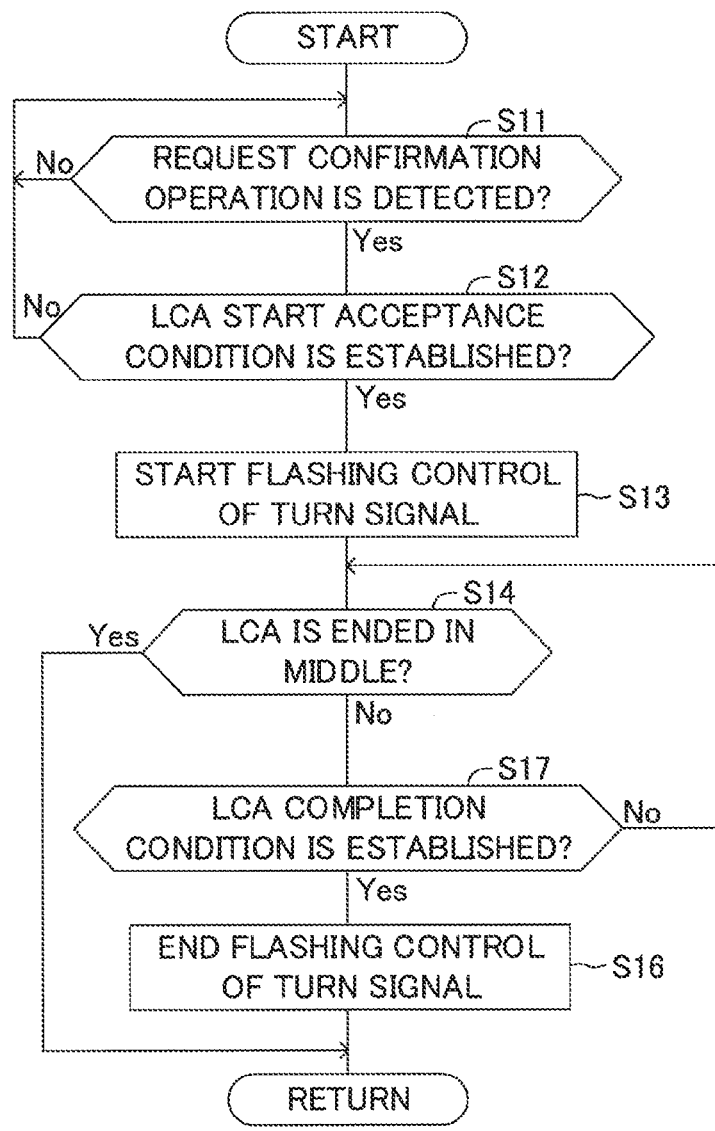
FIG. 9 is a flowchart for illustrating a turn signal control routine of Modification Example 1.

For example, in the embodiment, the intermittently-flashing of the turn signal 32 is stopped before the LCA is completed, but alternatively, the flashing of the turn signal 32 may be ended simultaneously with the completion of the LCA. FIG. 9 is an illustration of a turn signal control routine of Modification Example 1. Similarly to the turn signal control routine (FIG. 8) of the embodiment, the turn signal control routine of Modification Example 1 is also started when the LTA is being executed (LTA-ON state). In the following, in the turn signal control routine of Modification Example 1, the same processing as that in the turn signal control routine of the embodiment is denoted by a common step symbol, and description thereof is omitted. Only different procedures are described.

After the flashing control of the turn signal 32 is started in Step 13, when the LCA is ended in the middle (before the LCA is completed) (S14: Yes) or when the LCA completion condition is established (S17: Yes), the driving support ECU 10 ends the flashing control of the turn signal 32 (S16). That is, in Modification Example 1, the turn signal turning-off condition is established, when the LCA is completed or when the LCA is ended/terminated in the middle before the LCA is completed.

Also in Modification Example 1, similarly to the embodiment, after the LCA start acceptance condition is established, even when the operation force applied to the turn signal lever 41 is released to return the turn signal lever 41 to the neutral position, the intermittently-flashing of the turn signal 32 is continued until the turn signal turning-off condition is established. Therefore, the driver is not required to continue the operation on the turn signal lever 41, and is also not required to perform the returning operation on the turn signal lever 41 at the end of the LCA. Therefore, good operability can be achieved.

Modification Example 2

In the above-mentioned embodiment, when it is detected a state in which the remaining distance Dyr becomes equal to or smaller than the turning-off allowance distance Doff, the turn signal turning-off condition is established. In Modification Example 2, the turning-off allowance distance Doff is variably set in accordance with the LCA time mode set by the driver. That is, the turn signal turning-off condition can be changed in accordance with the reference lane change time period. Now, the processing of variably setting the turning-off allowance distance Doff is described.

Figure 10:
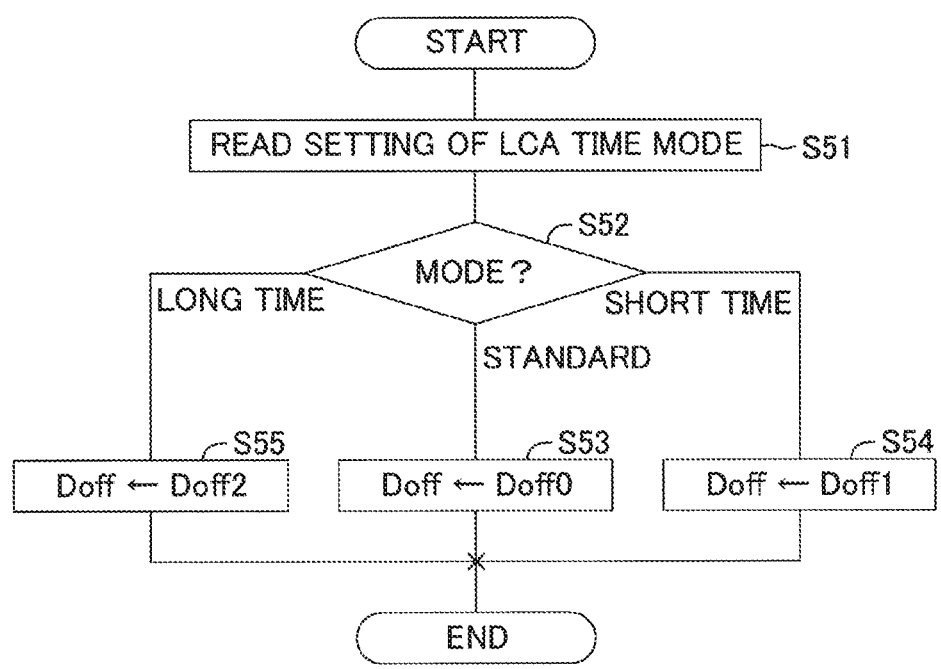
FIG. 10 is a flowchart for illustrating a turning-off allowance distance setting routine of Modification Example 2.

FIG. 10 is an illustration of a turning-off allowance distance setting routine executed by the driving support ECU 10. When the LCA start acceptance condition is established, the driving support ECU 10 executes the turning-off allowance distance setting routine.

In Step S51, the driving support ECU 10 reads the setting of the LCA time mode. Subsequently, in Step S52, the driving support ECU 10 determines the LCA time mode. When the LCA time mode is the standard time mode, in Step S53, the turning-off allowance distance Doff is set to a standard turning-off allowance distance Doff0. Further, when the LCA time mode is the short time mode, in Step S54, the driving support ECU 10 sets the turning-off allowance distance Doff to a short turning-off allowance distance Doff1. Further, when the LCA time mode is the long time mode, in Step S55, the driving support ECU 10 sets the turning-off allowance distance Doff to a long turning-off allowance distance Doff2.

The short turning-off allowance distance Doff1 is set to a distance shorter than the standard turning-off allowance distance Doff0 (Doff1<Doff0). Further, the long turning-off allowance distance Doff2 is set to a distance longer than the standard turning-off allowance distance Doff0 (Doff2>Doff0).

After the turning-off allowance distance Doff is set, the driving support ECU 10 terminates the turning-off allowance distance setting routine. The driving support ECU 10 sets the turning-off allowance distance Doff set in the turning-off allowance distance setting routine as the turning-off allowance distance in the turn signal turning-off condition 3-2.

In a case where the own vehicle changes lanes, when the intermittently-flashing of the turn signal 32 continues until the LCA is completed, the driver of the own vehicle and the drivers of other vehicles may misunderstand that the own vehicle is further changing lanes to the adjacent lane (lane which is two lanes away from the original lane). In view of this, in the above embodiment, the turning-off allowance distance Doff is provided so that the intermittently-flashing of the turn signal 32 is stopped when a state is detected in which the remaining distance Dyr from the reference point P of the own vehicle to the lane center line CL' of the target lane becomes equal to or smaller than the turning-off allowance distance Doff (e.g., 50 cm).

When the target trajectory is smooth, in other words, when the speed (referred to as "lateral movement speed") at which the own vehicle moves in the lane width direction when performing the LCA is low, the own vehicle travels at the position in the vicinity of the lane center line CL' of the target lane (but is a distance larger than the turning-off allowance distance away) for a long time period under a state in which the turn signal 32 is intermittently-lashing. Therefore, the driver of the own vehicle and the drivers of other vehicles may misunderstand the situation as described above if the turning-off allowance distance Doff is fixed.

The lateral movement speed is decreased as the reference lane change time period set in the LCA time mode is increased. In view of this, in Modification Example 2, the turning-off allowance distance Doff is increased as the reference lane change time period set in the LCA time mode is increased (that is, as the lateral movement speed is decreased) so that the timing to end the intermittently-flashing of the turn signal 32 (timing to satisfy the turn signal turning-off condition) becomes earlier. This allows the remaining distance Dyr when the turn signal turning-off allowance condition 3-2 is established to be increased. Therefore, even when the LCA time mode is set to the long time mode, the driver of the own vehicle and the drivers of other vehicles can be prevented from misunderstanding that the own vehicle is continuously changing lanes further.

In the above, the lane change assist devices for a vehicle according to the embodiment and the modified examples have been described, but the present invention is not limited to the above-mentioned embodiment and modified examples, and various changes are possible within the range not departing from the object of the present invention.

For example, in the embodiment and Modification Examples, the LCA is executed on the prerequisite condition that the steering assist control state is the LTA-ON state (state in which the LTA is being executed), but such prerequisite condition is not necessarily required.

For example, the conditions for changing the steering assist control state are not limited to the above-mentioned conditions, and can be set as appropriate.

What is claimed is:

1. A lane change assist device for a vehicle, comprising:
    a meter electronic control unit (ECU) programmed to intermittently flash a turn signal;
    a driving support electronic control unit (ECU) programmed to:
        detect a lane change assist request from a driver in response to a lane change assist request operation set in advance, the lane change assist request operation being an operation performed on a turn signal lever to intermittently flash the turn signal, and being performed in order to request lane change assist, wherein the turn signal lever is configured to return to a neutral position when an operation force of the lane change assist request operation is released;
        when the lane change assist request is detected and a lane change assist start acceptance condition set in advance is established, accept the lane change assist request and start lane change assist control to change lanes in which an own vehicle travels; and
        while executing the lane change assist control, determine whether or not a turn signal turning-off condition set in advance is established; and
        control the meter ECU in such a manner that the turn signal continues to be intermittently flashed from the acceptance of the lane change assist request to the establishment of the turn signal turning-off condition,
    wherein the turn signal turning-off condition is set to be established before the lane change assist control is completed,
    wherein the turn signal turning-off condition is set to be established after a specific point of the own vehicle crosses a boundary line between an original lane before changing lanes and a target lane being a destination of changing lanes, and before the lane change assist control is completed.

2. The lane change assist device for a vehicle according to claim 1, wherein the driving support ECU is further configured to detect the lane change assist request when the lane change assist request operation continues for an assist request confirmation time period set in advance or more.

3. A lane change assist device for a vehicle, comprising:
    a meter electronic control unit (ECU) programmed to intermittently flash a turn signal;
    a driving support electronic control unit (ECU) programmed to:
        detect a lane change assist request from a driver in response to a lane change assist request operation set in advance, the lane change assist request operation being an operation performed on a turn signal lever to intermittently flash the turn signal, and being performed in order to request lane change assist, wherein the turn signal lever is configured to return to a neutral position when an operation force of the lane change assist request operation is released;
        when the lane change assist request is detected and a lane change assist start acceptance condition set in advance is established, accept the lane change assist request and start lane change assist control to change lanes in which an own vehicle travels; and while executing the lane change assist control, determine whether or not a turn signal turning-off condition set in advance is established; and control the meter ECU in such a manner that the turn signal continues to be intermittently flashed from the acceptance of the lane change assist request to the establishment of the turn signal turning-off condition, wherein the turn signal turning-off condition is set to be established before the lane change assist control is completed, acquire a remaining distance in a lane width direction from a current position of the own vehicle to a final target position that is a position of the own vehicle when the lane change assist control is completed; and determine that the turn signal turning-off condition is established when the remaining distance is equal to or smaller than a turning-off allowance distance that is larger than zero.

4. The lane change assist device for a vehicle according to claim 3, wherein the driving support ECU is further configured to detect the lane change assist request when the lane change assist request operation continues for an assist request confirmation time period set in advance or more.

5. A lane change assist device for a vehicle, comprising:
a meter electronic control unit (ECU) programmed to intermittently flash a turn signal;
a driving support electronic control unit (ECU) programmed to:
detect a lane change assist request from a driver in response to a lane change assist request operation set in advance, the lane change assist request operation being an operation performed on a turn signal lever to intermittently flash the turn signal, and being performed in order to request lane change assist, wherein the turn signal lever is configured to return to a neutral position when an operation force of the lane change assist request operation is released;

when the lane change assist request is detected and a lane change assist start acceptance condition set in advance is established, accept the lane change assist request and start lane change assist control to change lanes in which an own vehicle travels; and while executing the lane change assist control, determine whether or not a turn signal turning-off condition set in advance is established; and control the meter ECU in such a manner that the turn signal continues to be intermittently flashed from the acceptance of the lane change assist request to the establishment of the turn signal turning-off condition, wherein the turn signal turning-off condition is set to be established before the lane change assist control is completed;

change the turn signal turning-off condition in such a manner that a timing at which the turn signal turning-off condition is established becomes earlier when a movement speed of the own vehicle in a lane width direction during the lane change assist control is lower as compared to when the movement speed is high.

6. The lane change assist device for a vehicle according to claim 5, wherein the driving support ECU is further programmed to change the turn signal turning-off condition in such a manner that a distance in a lane width direction from a position of the own vehicle when the turn signal turning-off condition is established to a final target position that is the position of the own vehicle when the lane change assist control is completed becomes longer when the movement speed of the own vehicle in the lane width direction during the lane change assist control is lower as compared to when the movement speed is high.

7. The lane change assist device for a vehicle according to claim 6,
wherein the driving support ECU is further programmed to:
acquire a remaining distance in the lane width direction from a current position of the own vehicle to the final target position; and
determine that the turn signal turning-off condition is established when the remaining distance is equal to or smaller than a turning-off allowance distance that is larger than zero, and
set the turning-off allowance distance to be longer when the movement speed of the own vehicle in the lane width direction during the lane change assist control is lower as compared to when the movement speed is high.

8. The lane change assist device for a vehicle according to claim 5, wherein the driving support ECU is further configured to detect the lane change assist request when the lane change assist request operation continues for an assist request confirmation time period set in advance or more.

* * * * *